United States Patent [19]
Yoshida et al.

[11] Patent Number: 5,963,388
[45] Date of Patent: *Oct. 5, 1999

[54] SIGNAL RECORDING OR REPRODUCING APPARATUS

[75] Inventors: Teruyuki Yoshida; Masahiro Kanaguchi, both of Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/622,752

[22] Filed: Mar. 27, 1996

[30] Foreign Application Priority Data

Mar. 27, 1995 [JP] Japan ................................ 7-068418

[51] Int. Cl.$^6$ .................................................. G11B 5/584
[52] U.S. Cl. ..................... 360/70; 360/77.12; 360/77.16; 360/75
[58] Field of Search ........................... 360/70, 75, 77.01, 360/77.16, 130.24, 72.2, 132, 47, 48, 64, 77.12; 386/110, 111, 109, 112

[56] References Cited

U.S. PATENT DOCUMENTS

| | | |
|---|---|---|
| 4,274,118 | 6/1981 | Mangold .................................. 360/84 |
| 5,313,347 | 5/1994 | Mitsuhashi et al. .................. 360/77.16 |
| 5,343,342 | 8/1994 | Kanagawa et al. .................. 360/77.16 |
| 5,384,676 | 1/1995 | Yokoyama et al. .................. 360/77.16 |
| 5,481,414 | 1/1996 | Takada et al. ............................. 360/64 |
| 5,502,606 | 3/1996 | Mori et al. ........................ 360/77.16 X |
| 5,504,642 | 4/1996 | Kinjo et al. .................... 360/130.24 X |
| 5,585,982 | 12/1996 | Yoshida et al. .......................... 360/107 |

*Primary Examiner*—Aristotelis M. Psitos
*Assistant Examiner*—K. Wong
*Attorney, Agent, or Firm*—Frommer Lawrence & Haug, LLP.; William S. Frommer

[57] ABSTRACT

During recording, a system controller 12 controls a travel control unit 4 to make a magnetic tape travel in a forward direction or a reverse direction at a constant speed and controls a drive motor 59 to cause a rotating drum 8 to rotate at a constant rotational speed so that one recording track is formed during a period where the magnetic tape is made to travel by at least two recording tracks. Further, the system controller 12 controls a reference voltage generation unit 13, controls an angle of inclination of the rotating drum 8 in accordance with the direction of travel of the magnetic tape, and controls the angle of inclination of the path of the magnetic head 9 on the magnetic tape to be constant regardless of the direction of travel so as to perform the recording.

18 Claims, 20 Drawing Sheets

CONFIGURATION OF DIGITAL VTR

CONFIGURATION OF DIGITAL VTR

SIGNAL RECORDING OR REPRODUCING APPARATUS

BACKGROUND OF THE INVENTION

1. Field of the Invention

The present invention relates to an apparatus for the recording or reproduction of a signal on a tape-like recording medium by a rotary head, more particularly relates to an apparatus for the recording or reproduction of the signal reciprocally on a tape-like recording medium by controlling an angle of inclination of the rotary head.

2. Description of the Related Art

Known in the art is a digital video tape recorder apparatus (hereinafter referred to as a "digital VTR") which records and reproduces audio, video, and other data in the form of digital information on a magnetic tape. In such a digital VTR, to achieve both of an improvement of the frequency characteristics by an increase of the relative speed of the magnetic head and the magnetic tape and a reduction of the amount of use of the magnetic tape at the time of recording and reproduction, the data is recorded and reproduced by helical scanning, that is, using a rotary head drum on which a magnetic head are arranged and scanning the surface of the magnetic tape wound at an angle around the rotary head drum by the magnetic head.

The rotary head drum used in such a digital VTR is comprised, for example, as shown in FIG. 1, of a rotary head drum 91 on which a magnetic head 90 having a single head gap is attached and guide rollers 93 and 94 regulating the travel of the magnetic tape 92. The guide rollers 93 and 94 wind the magnetic tape 92 around the rotary head drum 91 at an angle.

As shown in for example FIG. 2, there is another rotary head drum which has two magnetic heads 95 and 96 each having a single head gap at facing positions of the rotary head drum 91. Here, the winding angle of the magnetic tape 92 is set to about a half of that in the case where one magnetic head 90 is provided on the rotary head drum 91.

In the above digital VTR, when recording data using these rotary head drums, the magnetic tape 92 is made to travel at a constant speed by a capstan servo system and the rotary head drum 91 is rotated at a constant speed by a magnetic head speed control system.

The relationship between the rotational speed of the rotary head drum and the travelling speed of the magnetic tape is determined so that, for high density recording on the magnetic tape, where one magnetic head is provided on the rotary head drum as shown in FIG. 1, one recording track having a predetermined angle of inclination is formed during one rotation of the rotary head drum and so that recording tracks are formed continuously without gaps at the predetermined angle of inclination when the rotary head drum continuously rotates. When two magnetic heads are provided on the rotary head drum as in FIG. 2, two recording tracks having the predetermined angle of inclination are formed during one rotation of the rotary head drum and recording tracks are continuously formed without gaps at the predetermined angle of inclination when the rotary head drum continuously rotates.

When the recording is carried out on the magnetic tape 92 by the magnetic head 90 or the magnetic heads 95 and 96 attached to the rotary head drum 91 in this state, as shown in FIG. 3, recording tracks 97 inclined by the amount of the predetermined angle are formed on the magnetic tape 92 without gaps.

Note that, where the above magnetic head 90 or the magnetic heads 95 and 96 has a plurality of N number of head gaps, in the configuration of FIG. 1, N number of recording tracks having the predetermined angle of inclination are formed during one rotation of the rotary head drum and recording tracks having the predetermined angle of inclination are continuously formed without gaps when the rotary head drum continuously rotates. Further, in the configuration of FIG. 2, 2N number of recording tracks having the predetermined angle of inclination are formed during one rotation of the rotary head drum and recording tracks having the predetermined angle of inclination are continuously formed without gaps when the rotary head drum continuously rotates.

In such a digital VTR, further recording and reproduction after the recording and reproduction in the FWD direction is ended requires the rewinding of the magnetic tape. For this reason, so as to perform recording again, it is necessary to first rewind all of the magnetic tape and so there is a problem that a long time is required until recording can be restarted. Particularly, handheld video cameras etc. are designed to save power, so the rewinding speed is very low and a significant time is required for the rewinding operation. Further, even if it becomes urgently necessary to record a scene, recording is impossible during this rewinding.

Here, so as to solve this problem, reciprocal recording wherein, when the recording in one direction is ended, the direction of travel of the magnetic tape is reversed and recording in the other direction is carried out can be considered.

In the above digital VTR, however, when just performing the recording by setting the direction of supply of the magnetic tape to the reverse (REV) direction without changing the rotational speed of the rotary head drum, as shown in FIG. 4, the angle of inclination of the recording track 98R formed becomes different from the angle of inclination of the recording track 98F of the forward (FWD) direction. Since the recording tracks 97 are formed in the FWD direction without gaps, the recording will be carried out while overwriting the data on the FWD direction recording tracks and therefore reciprocal recording and reproduction cannot be carried out as in an audio magnetic cassette tape.

To perform reciprocal recording by using a digital VTR, when recording in the forward (FWD) direction or the reverse (REV) direction, where one magnetic head has one head gap, it is necessary to form the recording tracks at every other track and, where one magnetic head has a plurality of N number of head gaps, it is necessary to form the recording tracks at every other N number of tracks.

In this case, first, the speed of travel of the magnetic tape 92 is made two times higher than that when the recording tracks are formed without gaps without changing the rotational speed of the rotary head drum 91 and the recording carried out making the magnetic tape travel in the FWD direction. Due to this, during the period where one or N number of recording tracks are recorded, the magnetic tape is shifted by 2 (or 2N) recording tracks and, as shown in FIG. 5A, the FWD direction recording tracks 99F are formed at every other (or every other N number) of tracks on the magnetic tape 92.

Next, when the magnetic tape is made to travel up to the end, the direction of travel of the magnetic tape is reversed to the REV direction and recording carried out while maintaining the same speed of travel for the magnetic tape. Due to this, as shown in FIG. 5B, the REV direction recording tracks 99R are formed at every other (or every other N number) of tracks.

In general, however, the angle of inclination of the rotary head drum is fixed to the angle of inclination when performing the recording in the FWD direction, so the angles of inclination of the FWD direction recording tracks 99F and the REV direction recording tracks 99R are different. For this reason, when recording in the REV direction after recording in the FWD direction, as shown in FIG. 5C, the recording is made with the REV direction recording tracks 99R partially overlapping the FWD direction recording tracks 99F on which the data was previously recorded, so there is a problem in that reciprocal recording cannot be carried out.

OBJECT AND SUMMARY OF THE INVENTION

The present invention was made in consideration of the above problems and has as an object thereof to provide a recording apparatus in which the angle of inclination of the forward direction recording tracks and the angle of inclination of the reverse direction recording tracks are made to match and, at the same time, the reverse direction recording tracks can be recorded on between the forward direction recording tracks for reciprocal recording.

To attain the above object, according to a first aspect of the present invention, there is provided a signal recording apparatus wherein a tape-like recording medium is made to travel in a first direction of travel and a second direction of travel reverse to this first direction of travel and the signal is recorded on the tape-like recording medium by a rotary head, including a signal processing means, including a synchronization detecting means for detecting synchronization information of the input signal, for processing the input signal to a signal to be recorded on the tape-like recording medium; a rotary head means, having a recording head means for forming N (any integer) number of recording tracks per scan on the tape-like recording medium, for recording the signal from the signal processing means on the tape-like recording medium; a recording control means for controlling the speed of travel of the tape-like recording medium and the rotational speed of the rotary head means based on the synchronization information so that the recording tracks are formed on the tape-like recording medium by the rotary head means in units of N number of tracks every other N number of tracks; an angle of inclination control means for controlling the inclination of the rotary head means for setting the angle of inclination of the recording tracks formed by the rotary head means with respect to the direction of travel of the tape-like recording medium to a plurality of different angles; and a control means for controlling the recording of the output signal of the signal processing means to the tape-like recording medium by making the tape-like recording medium travel in the first direction of travel and second direction of travel, which control means controls the recording control means and the angle of inclination control means so that the recording tracks are formed at a predetermined angle of inclination when recording by making the tape-like recording medium travel in the first direction of travel, controls the recording control means so that the recording tracks are formed between the recording tracks formed at the recording in the first direction of travel when recording by making the tape-like recording medium travel in the second direction of travel, and controls the angle of inclination control means so that the recording tracks formed at this time become parallel to the recording tracks formed at the recording in the first direction of travel.

According to a second aspect of the present invention, there is provided a signal reproducing apparatus wherein recording tracks having a predetermined angle of inclination are formed in units of N (any integer) number of tracks every other N number of tracks in recording in a first direction of travel for recording of the signal, N number of recording tracks of the predetermined angle of inclination are newly formed between the recording tracks formed at the recording in the first direction of travel in a second direction of travel reverse to the first direction of travel for recording of the signal, and, further, a tape-like recording medium on which a control signal for the recording in the first direction of travel and second direction of travel is recorded is made to travel in the first direction of travel and the second direction of travel for reproduction of the recorded signal by a rotary head, comprising a rotary head means, having a reproduction head means for reproducing a signal from the recording tracks of the tape-like recording medium in units of N number of tracks per scan, for obtaining a reproduced signal from the recording tracks formed on the tape-like recording medium; a control signal reproducing means for reproducing the control signal recorded on the tape-like recording medium; a signal processing means for processing the reproduced signal to form an output signal; a reproduction control means for controlling the speed of travel of the tape-like recording medium and the rotational speed of the rotary head means based on the control signal so that the signal recorded on the recording tracks on the tape-like recording medium in units of N number of tracks every other N number of tracks is reproduced by the rotary head means; an angle of inclination control means for controlling the inclination of the rotary head means so as to set the angle of the path of scanning of the reproduction head means with respect to the direction of travel of the tape-like recording medium to a plurality of angles; and a control means for controlling the reproduction of the signal recorded on the tape-like recording medium based on the reproduced control signal by making the tape-like recording medium travel in the first direction of travel and the second direction of travel, which control means controls the reproduction control means and the angle of inclination control means so as to scan the recording tracks at the predetermined angle of inclination when reproducing by making the tape-like recording medium travel in the first direction of travel and controls the reproduction control means and the angle of inclination control means so that the recording tracks between the recording tracks scanned at the reproduction in the first direction of travel are scanned when reproducing by making the tape-like recording medium travel in the second direction of travel.

According to a third aspect of the present invention, there is provided a signal recording and reproducing apparatus wherein a tape-like recording medium is made to travel in a first direction of travel and a second direction of travel reverse to this first direction of travel, a signal is recorded on the tape-like recording medium by a rotary head, and the signal recorded in this way is reproduced by a rotary head, including a recording signal processing means, including a synchronization detecting means for detecting synchronization information of an input signal, for processing the input signal to a signal to be recorded on the tape-like recording medium; a rotary head means, having a recording head means forming N (any integer) number of recording tracks per scan on the tape-like recording medium for recording the signal from the signal processing means; a reproduction head means for reproducing the signal recorded on the N number of recording tracks per scan on the tape-like recording medium; a reproduced signal processing means for processing the signal from the reproduction head means to form an output signal; a control signal forming means for forming a control signal based on the synchronization information; a control signal recording and reproduction means for recording and reproducing the control signal in the longitudinal direction of the tape-like recording medium; a recording and reproduction control means for controlling the speed of travel of the tape-like recording medium and the rotational speed of the rotary head means based on the synchronization information so that the recording tracks are formed in the tape-like recording medium in units of N number of tracks every other N number of tracks by the rotary head means when recording the signal on the recording medium and controlling the speed of travel of the tape-like recording medium and the rotational speed of the rotary head means based on the reproduced control signal so that the signal recorded on the recording tracks of the tape-like recording medium is reproduced by the rotary head means in units of N number of tracks every other N number of tracks when reproducing the signal from the recording medium; an angle of inclination control means for controlling the inclination of the rotary head means so as to set the angle exhibited by the path of the scanning of the recording head means and the reproduction head means with respect to the direction of travel of the tape-like recording medium to a plurality of different angles; and a control means for controlling the recording of the output signal of the signal processing means to the tape-like recording medium and, at the same time, controlling the reproduction of the signal recorded on the tape-like recording medium by making the tape-like recording medium travel in the first direction of travel and second direction of travel, which control means controls the recording and reproduction control means and the angle of inclination control means so that the recording tracks are formed at the predetermined angle of inclination with respect to the direction of travel of the tape-like recording medium when recording by making the tape-like recording medium travel in the first direction of travel, controls the recording and reproduction control means so that the recording tracks are formed between the recording tracks formed at the recording in the first direction of travel when recording by making the tape-like recording medium travel in the second direction of travel, controls the angle of inclination control means so that the recording tracks formed at this time become parallel to the recording tracks formed at the recording in the first direction of travel, controls the recording and reproduction control means and the angle of inclination control means based on the reproduced control signal so as to scan the recording tracks at the predetermined angle of inclination when reproducing by making the tape-like recording medium travel in the first direction of travel, and controls the recording and reproduction control means and the angle of inclination control means based on the reproduced control signal so that the recording tracks between the recording tracks scanned at the reproduction in the first direction of travel are scanned when reproducing by making the tape-like recording medium travel in the second direction of travel.

BRIEF DESCRIPTION OF THE DRAWINGS

These and other objects and features of the present invention will become more apparent from the following description of the preferred embodiments made with reference to the attached drawings, wherein.

DETAILED DESCRIPTION OF THE PREFERRED EMBODIMENTS

Figure 1:
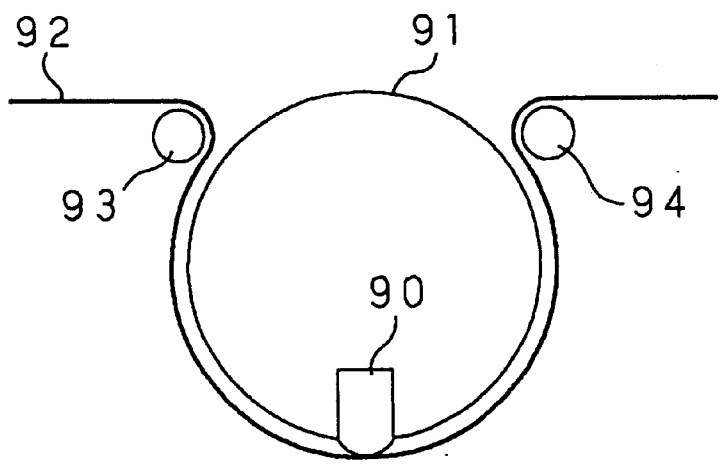
FIG. 1 is a view of the configuration of a rotary head drum of a conventional digital VTR.
Figure 2:
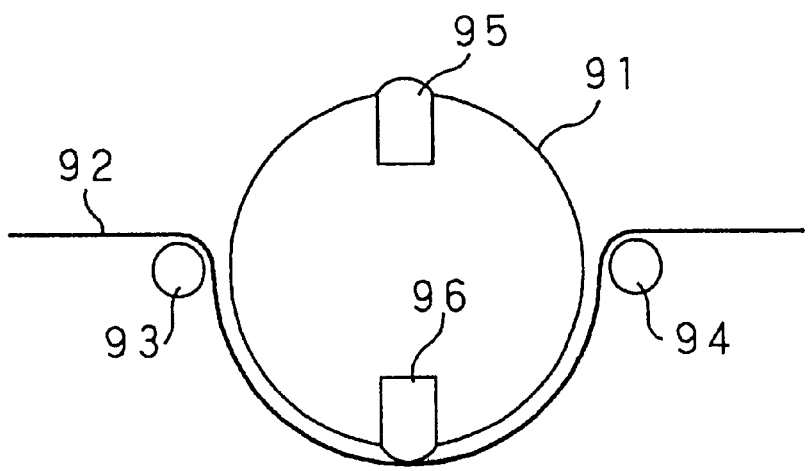
FIG. 2 is a view of another configuration of a rotary head drum of a conventional digital VTR.

Below, preferred embodiments of the present invention will be explained in detail by referring to the drawings.

Figure 6:
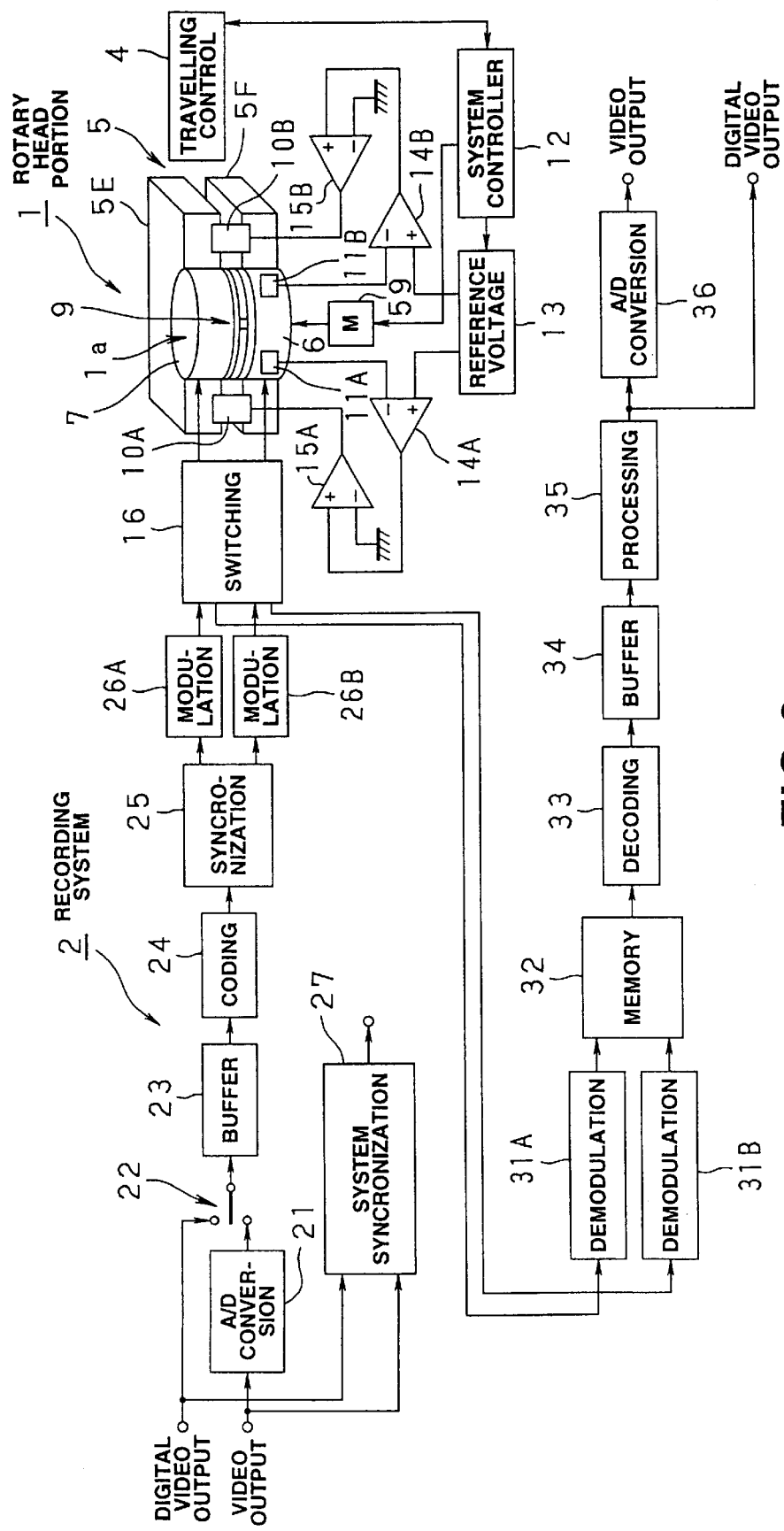
FIG. 6 is a block diagram of the configuration of a first embodiment in which a recording apparatus according to the present invention is applied to a digital VTR.

As a first embodiment, the recording apparatus of the present invention can be applied to a digital VTR as shown in FIG. 6 which records and reproduces video and audio data as digital data on a magnetic tape.

This digital VTR of the first embodiment is provided with a rotary head portion 1 which performs the recording and reproduction of the recording data in a digital manner, a recording system 2 which forms recording data based on a video signal or video data supplied from the outside and supplies the same to the rotary head portion 1, and a reproduction system 3 which reproduces the video data from the rotary head portion 1 and outputs the result.

The rotary head portion 1 is provided with a rotary head drum 1a which records and reproduces the recording data on the magnetic tape at an angle, a travel control unit 4 controlling the travel of the magnetic tape wound around the rotary head drum 1a at a constant speed, a supporting portion 5 to which the rotary head drum 1a is affixed, a system controller 12 performing the control of the overall apparatus, a reference voltage generation unit 13 generating a reference voltage under the control of the system controller 12, etc.

The rotary head drum 1a is constituted by a columnar stationary lower drum 6, a similar columnar stationary upper drum 7, and a disk-like rotating drum 8 rotatably provided in the stationary upper drum 7. At the circumference of the rotating drum 8, two magnetic heads 9 are provided facing each other 180 degrees apart. Note that it is assumed that each of the magnetic heads has a single head gap.

This rotary head drum 1a is further provided with a driving motor 59 which rotates the rotary head drum 8 at a constant rotational speed under the control of the system controller 12.

The supporting portion 5 is constituted by a lower drum affixing portion 5F affixed to the stationary lower drum 6 and an upper drum affixing portion 5E affixed to the stationary upper drum 7. The lower drum affixing portion 5F and the upper drum affixing portion 5E are connected to each other at the center portions and have a lying down H-shape configuration seen from the side surface.

The supporting portion 5 is further provided with piezoelectric actuators 10A and 10B which expand or contract in accordance with a supplied voltage spanning the distance between the lower drum affixing portion 5F and the upper drum affixing portion 5E.

This rotary head portion 1 is further provided with distance sensors 11A and 11B for detecting a distance between the stationary lower drum 6 and the stationary upper drum 7, differential amplifiers 14A, 14B, 15A, and 15B driving the piezoelectric actuators 10A and 10B based on the reference voltage from the reference voltage generation unit 13 and the detection output of the distance sensors 11A and 11B and a switching portion 16 which switches to the recording signal supplied from the recording system 2 and supplies the same to the magnetic head 9 and switches to the reproduced signal of the magnetic tape from the magnetic head 9 and supplies the same to the reproduction system 3.

The recording system 2 is provided with an analog-to-digital (A/D) conversion unit 21 which performs A/D conversion on a video signal supplied from the outside in an analog format, a switching unit 22 which switches between the video data from the A/D conversion unit 21 and the video data supplied from the outside in a digital format and outputs the result, and a buffer 23 to which the video data from the switching unit 22 is supplied.

This recording system 2 is further provided with a coding unit 24 which reads the video data from the buffer 23 and codes the same and, at the same time, adds an error correction code to this and outputs the result, a synchronization generation unit 25 which adds synchronization information to the output of the coding unit 24 and outputs the result, and modulation units 26A and 26B which perform for example so-called 8-16 (Eight-Sixteen Modulation) coding on the output of the synchronization generation unit 25 and supplies the same to the switching unit 16.

The reproduction system 3 is provided with demodulation units 31A and 31B which apply 8-16 decoding processing to the reproduced signal which is reproduced by the rotary head portion 1 and supplied via the switching unit 16, a memory 32 to which the reproduced data demodulated by the demodulation units 31A and 31B are supplied, and a decoding unit 33 which applies error correction processing to the reproduced data read from the memory 32 and, at the same time, applies decoding processing to this and outputs the result.

This reproduction system 3 is further provided with a buffer 34 holding the decoded output from the decoding unit 33, a processing unit 35 performing processing on the decoded output from the buffer 34, and a digital-to-analog (D/A) conversion unit 36 which performs D/A conversion on the output of the processing unit 35 and outputs the result.

Figure 7:
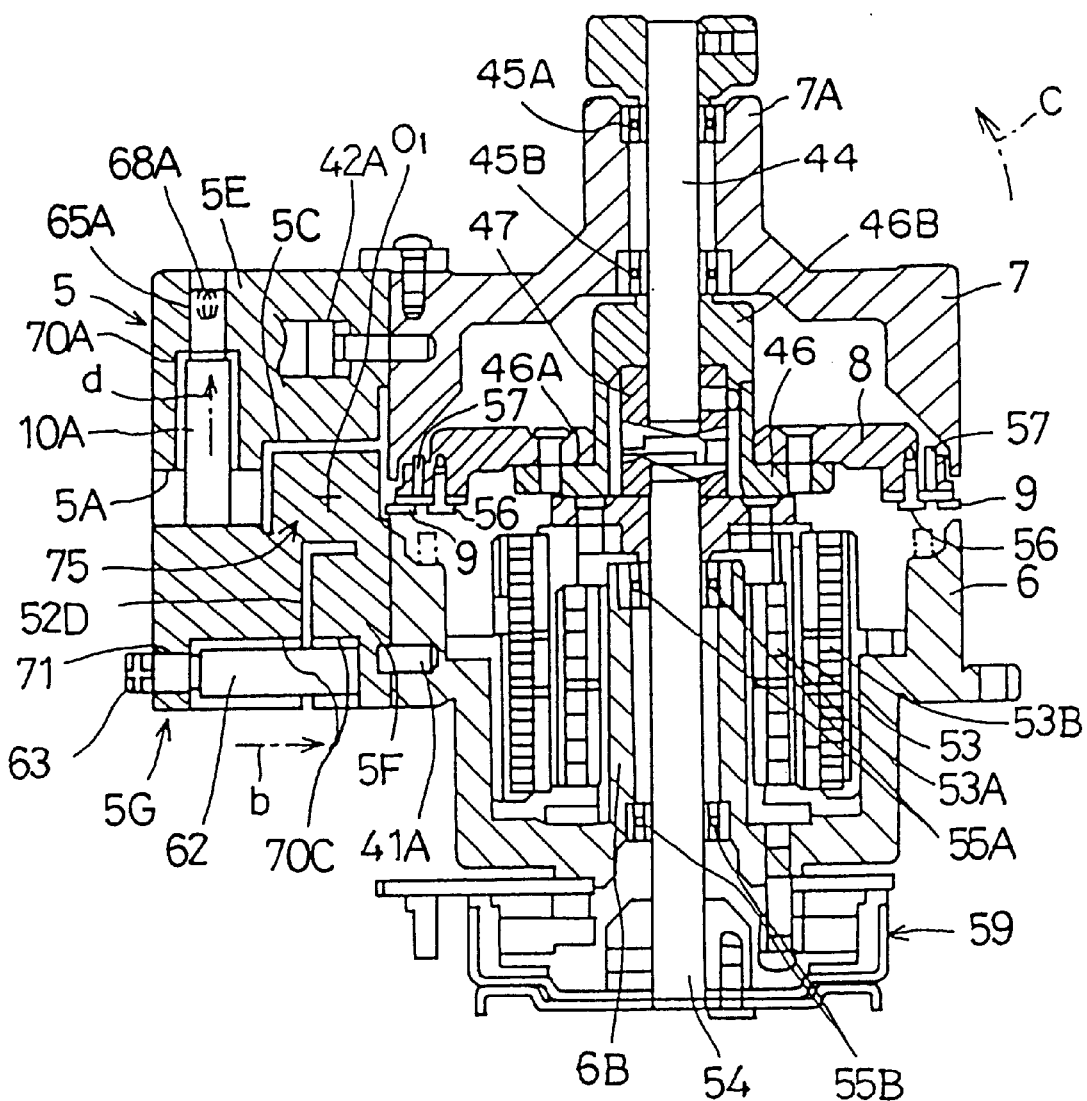
FIG. 7 is a sectional view of a concrete configuration of a rotary head drum of a digital VTR.

Here, further concretely explaining the configuration of the rotary head drum 1a, as shown in FIG. 7, the stationary lower drum 6 and the stationary upper drum 7 are affixed to the supporting portion 5 by a screw 41A and a screw 42A, respectively.

The stationary upper drum 7 is formed with a bearing holding portion 7A having a cylindrical shape. A rotary shaft 44 is rotatably supported via the bearings 45A and 45B held by the bearing holding portion 7A.

In the lower end of the rotary shaft 44, a fitting portion 46B having a cylindrical shape formed at the center portion of a flange 46 is fitted and affixed. To an attachment surface (upper surface) 46A of this flange 46, a rotating drum 8 is affixed. Further, at positions of the circumference of the rotating drum 8 facing each other by 180 degrees, two head plates 56 are fastened. The two magnetic heads 9 are affixed via the head plates 56 so as to slightly project from the circumferential edge of the rotating drum 8. These magnetic heads 9 can be finely adjusted in the heights thereof by an adjustment screw 57, respectively. Due to this, the magnetic heads 9 attached to the rotating drum 8 can be rotated integrally with the rotary shaft 44.

The stationary lower drum 6 is also formed with a bearing holding portion 6B. A rotary shaft 14 is rotatably supported by the bearings 55A and 55B held by the bearing holding portion 6B. This rotary shaft 14 and the rotary shaft 44 provided on the stationary upper drum 7 side are connected by a flexible joint 47. The rotary shaft 44 can be rotated integrally with the rotary shaft 54 when rotating the rotary shaft 14 by driving the drive motor 59.

Thus, by driving the drive motor 59, the magnetic head 9 can be rotated via the rotary shafts 54 and 44 and the rotating drum 8.

To the lower end portion of the flexible joint 47, a rotor 53B of a rotary transformer 53 is affixed. This rotor 53B can rotate integrally with the flexible joint 47. Further, a stator 53A of the rotary transformer 53 is affixed to the surface of the bearing holding portion 6B of the stationary lower drum 6.

In this rotary head portion 1a, when the magnetic head 9 is replaced, the rotating drum 8 is replaced together with the stationary upper drum 7. At this time, the assembly is made so that the degree of parallelism of the attachment surface 46A of the flange 46 affixed to the rotary shaft 44 (namely the perpendicularity of the attachment surface 46A of the flange 46 with respect to the rotary shaft 44) and the degree of planarity of the attachment surface of the rotary head drum 8 with respect to the flange 46 are within the preliminarily set tolerances and the error of the path of rotation of the magnetic head 9 with respect to the stationary upper drum 7 is controlled within an allowable range.

Accordingly, by replacing the stationary upper drum 7 having the rotating drum 8 installed therein as mentioned above, the attachment error of the rotating drum 8 occurring where only the rotating drum 8 is replaced can be eliminated.

Further, if only the rotating drum 8 is replaced when a plurality of magnetic heads 9 are attached to the rotating drum 8 as mentioned above, it is necessary to adjust the paths of rotation of a plurality of magnetic heads 9 in a state where the rotating drum 8 is attached to the rotary head portion 1a. When the stationary upper drum 7 having the rotating drum 8 installed therein is replaced as mentioned above, however, it is possible to adjust the paths of rotation of the magnetic heads 9 in a state where the rotary shaft 44, the flange 46, and the rotating drum 8 are attached to the stationary upper drum 7 in advance. By newly installing a stationary upper drum 7 in which the rotating drum 8 is preliminarily installed and the paths of rotation of the magnetic heads 9 are adjusted, it is possible to facilitate the adjustment of the paths of rotation of the magnetic heads 69.

Figure 8:
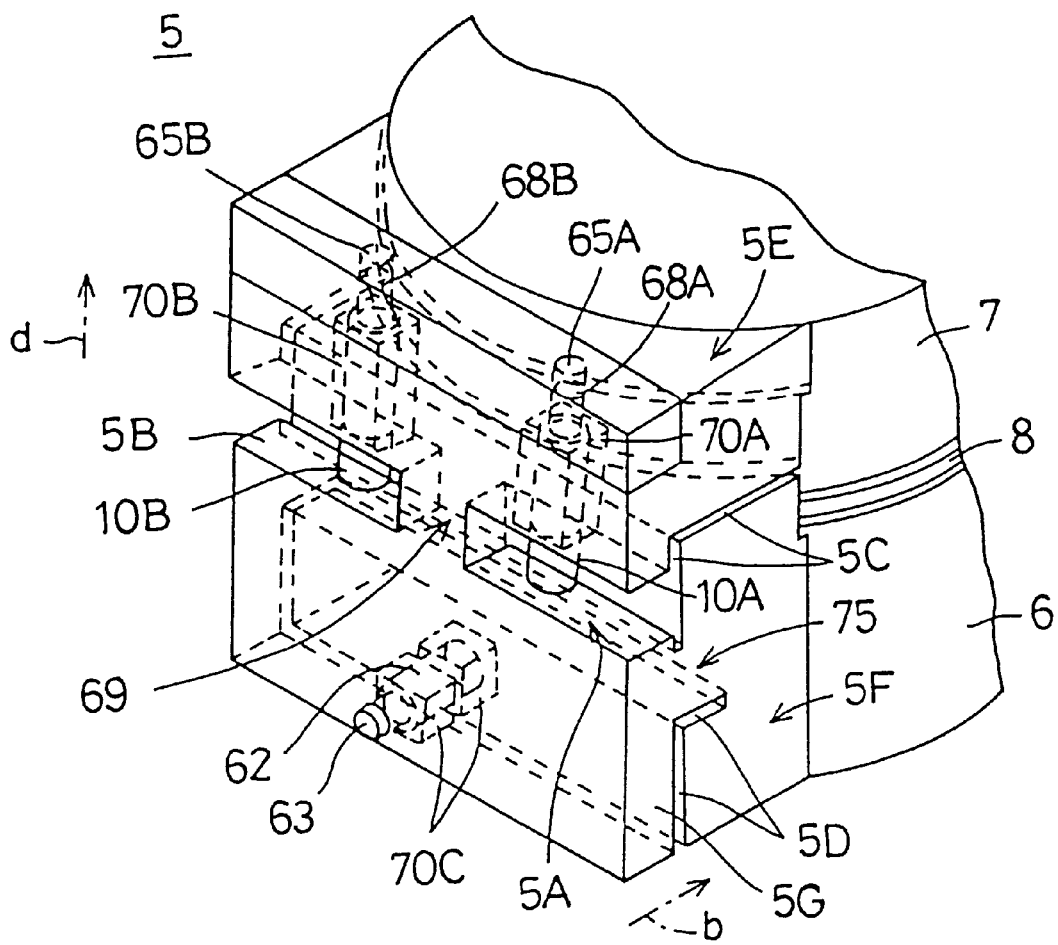
FIG. 8 is a perspective view of a concrete shape of a supporting portion of the rotary head drum.

In the supporting portion 5 supporting the stationary upper drum 7 and the stationary lower drum 6, two slits 5C and 5D are formed. Further, as shown in FIG. 8, recesses 5A and 5B are formed while being communicated with the slit 5C.

Accordingly, the supporting portion 5 is divided by the slit 5C into an upper drum affixing portion 5E supporting the stationary upper drum 7 and a lower drum affixing portion 5F supporting the stationary lower drum 6. The upper drum affixing portion 5E and the lower drum affixing portion 5F are formed while being connected by a connection portion 9 formed between the recesses 5A and 5B.

In the upper portion of this recess 5A, a support hole 70A is formed in a vertical direction, in which support hole 70A is provided a columnar piezoelectric actuator 10A. In this piezoelectric actuator 10A, a lower end abuts against the bottom surface of the recess 5A, and further an upper end abuts against the screw 68A screwed into the screw hole 65A, whereby this is affixed to the bottom surface of the recess 5A and the screw 68A.

Further, in the upper portion of the recess 5B, a support hole 70B is formed in the vertical direction, in which support hole 70B a columnar piezoelectric actuator 10B is provided. In this piezoelectric actuator 10B, a lower end abuts against the bottom surface of the recess 5B, and further an upper end abuts against the screw 68B screwed into the screw hole 65B, whereby this is affixed to the bottom surface of the recess 5B and the screw 68B.

The piezoelectric actuators 10A and 10B expand or contract in the longitudinal direction thereof in accordance with the respectively supplied voltages, that is, in a direction indicated by an arrow d in FIG. 8 and a direction reverse to the arrow d. Accordingly, by controlling the voltages supplied to the piezoelectric actuators 10A and 10B to cause the contraction of the piezoelectric actuator 10A and cause the expansion of the piezoelectric actuator 10B, the upper drum affixing portion 5E is made to incline in a direction indicated by an arrow a in FIG. 9B about the support point $O_2$ of the connection portion 69.

Figure 9A:
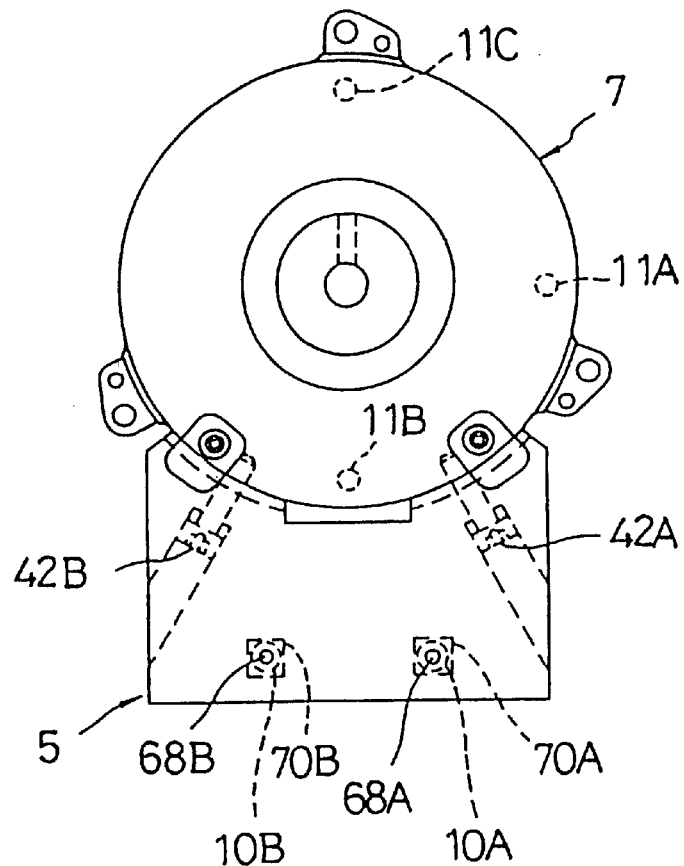
FIGS. 9A and 9B are views of the concrete shape of the rotary head drum.
Figure 9B:
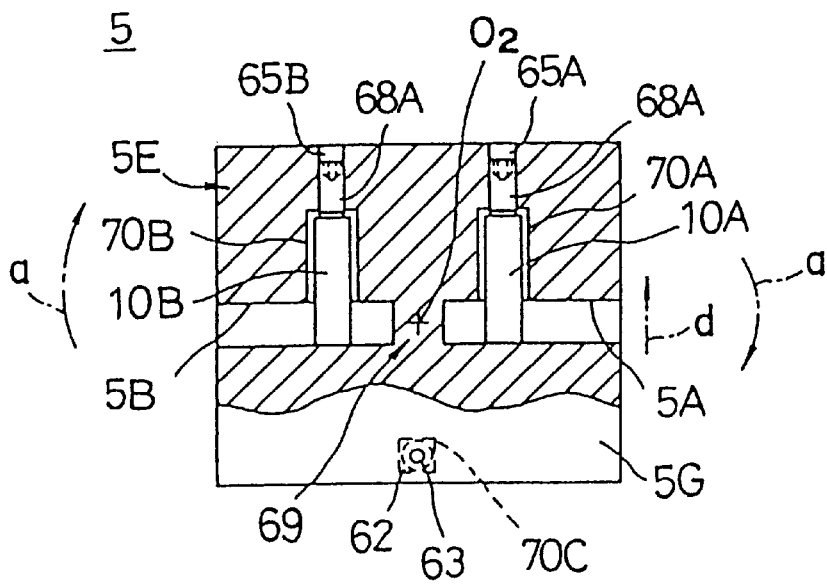

Conversely, by causing the expansion of the piezoelectric actuator 10A and causing the contraction of the piezoelectric actuator 10B, the upper drum affixing portion 5E is made to incline in a direction reverse to the arrow a in FIG. 9B about the support point $O_2$ of the connection portion 69.

Figure 10A:
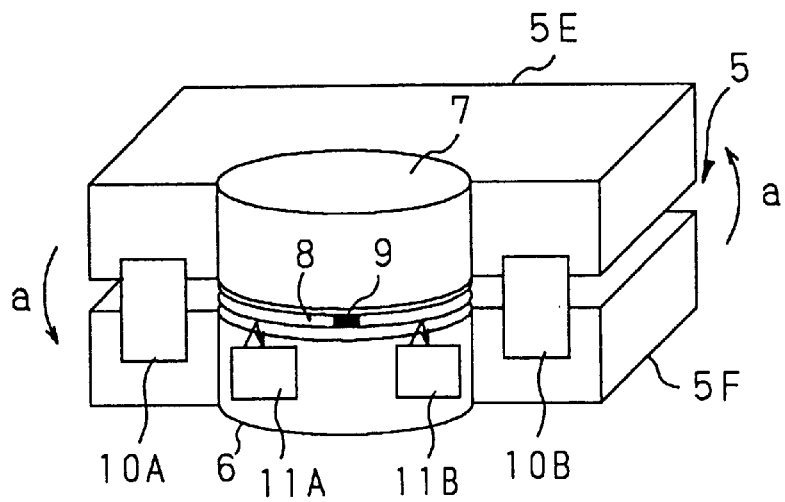
FIGS. 10A to 10C are views explaining the adjustment of the rotary head drum in an azimuth direction.
Figure 10B:
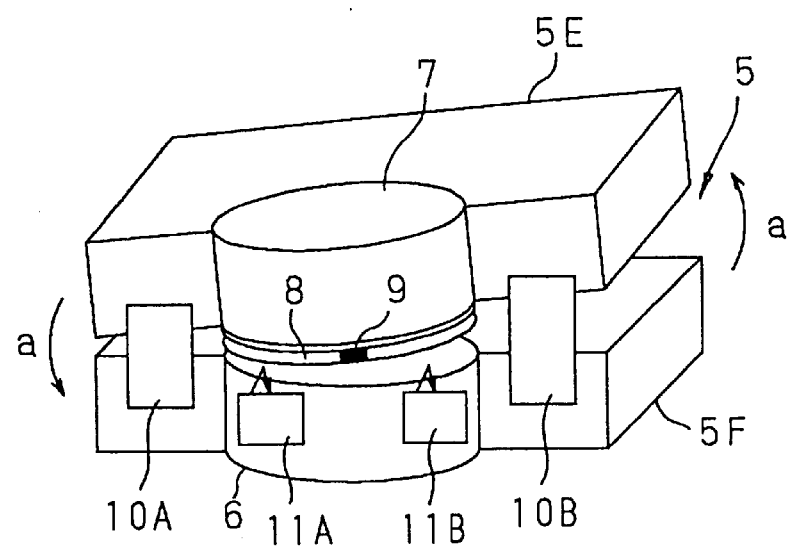

As a result, as shown in FIG. 10A showing the supporting portion 5 of FIG. 9B from the opposite side of the page surface as the rotary head drum 1a, when the upper drum affixing portion 5E is inclined in the direction indicated by the arrow a by the piezoelectric actuators 10A and 10B in a state where the stationary upper drum 7 is horizontal, as shown in FIG. 10B, the stationary upper drum 7 affixed to the upper drum affixing portion 5E is inclined in the direction indicated by the arrow a. Accordingly, the rotating drum 8 integrally formed in the upper drum affixing portion 5E is inclined in the direction indicated by the arrow a together with the stationary upper drum 7 and, as a result, the path of the magnetic head 9 affixed to the rotating drum 8 can be inclined with respect to the magnetic tape coming into sliding contact with the circumferential surface of the stationary upper drum 7 and the stationary lower drum 6.

Figure 10C:
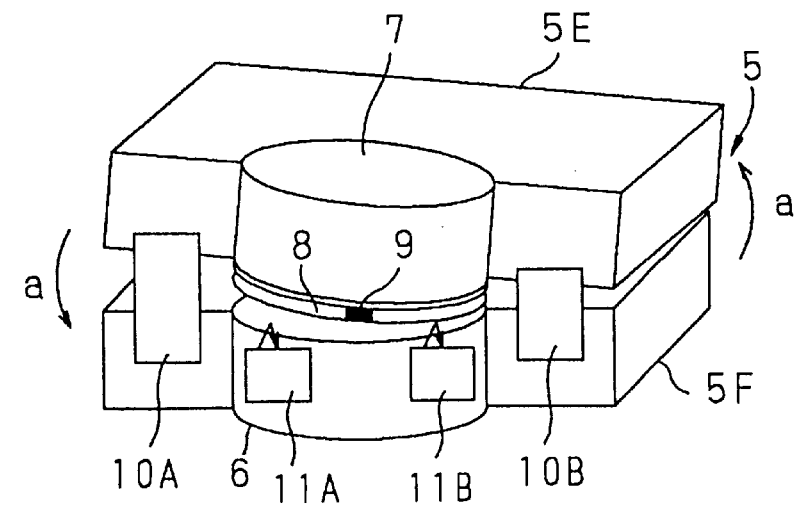

Further, when the upper drum affixing portion 5E is inclined in the direction reverse to the arrow a by the piezoelectric actuators 10A and 10B, as shown in FIG. 10C, the stationary upper drum 7 affixed to the upper drum affixing portion 5E is inclined in the direction reverse to the arrow a in accordance with this. Accordingly, also the rotating drum 8 integrally formed in the upper drum affixing portion 5E is inclined in a direction reverse to the arrow a together with the stationary upper drum 7, and, as a result, the path of the magnetic head 9 affixed to the rotating drum 8 can be inclined with respect to the magnetic tape coming into sliding contact with the circumferential surface of the stationary upper drum 7 and the stationary lower drum 6.

In this way, by adjusting the amounts of expansion and contraction of the piezoelectric actuators 10A and 10B by the voltages supplied to them, the scanning path of the magnetic head 9 with respect to the magnetic tape can be inclined in the azimuth direction. Below, such an adjustment to the azimuth direction will be referred to as adjustment of the degree of horizontality.

Further, in FIG. 8, the supporting portion 5 is divided by a slit 5D formed in the vertical direction into the lower drum affixing portion 5F affixing the stationary lower drum 6 and upper drum affixing portion 5E affixing the stationary upper drum 7 and the zenith adjustment portion 5G connected to them via a connection portion 75.

In the zenith adjustment portion 5G is formed a support hole 70C communicated with the lower drum affixing portion 5F. The piezoelectric actuator 62 is held in the support hole 70C by a screw 63 screwed into the screw hole 71. By adjusting the voltage supplied to this piezoelectric actuator 62, the piezoelectric actuator 62 can be made to expand or contract.

Accordingly, by causing the expansion of the piezoelectric actuator 62, the zenith adjustment portion 5G can be displaced in a direction of approaching the lower drum affixing portion 5F, that is, in the direction indicated by the arrow b, and, at the same time, by causing the contraction of the piezoelectric actuator 62, the zenith adjustment portion 5G can be displaced in the direction moving away from the lower drum affixing portion 5F, that is, in the direction reverse to the arrow b.

Accordingly, as shown in FIG. 8, when displacing the zenith adjustment portion 5G in the direction indicated by the arrow b with respect to the lower drum affixing portion 5F by the piezoelectric actuator 62, the stationary upper drum 7 can be displaced via the upper drum affixing portion 5E connected to the zenith adjustment portion 5G. The direction of displacement of this stationary upper drum 7 becomes the direction indicated by the arrow c about the support point $O_1$ of the connection portion 75 of the supporting portion 5.

Conversely, when the zenith adjustment portion 5G is displaced in the direction reverse to the arrow b with respect to the lower drum affixing portion 5F, the stationary upper drum 7 can be displaced via the upper drum affixing portion 5E connected to the zenith adjustment portion 5G. The direction of displacement of this stationary upper drum 7 becomes the direction reverse to the arrow c about the support point $O_1$ of the connection portion 75 of the supporting portion 5.

Figure 11A:
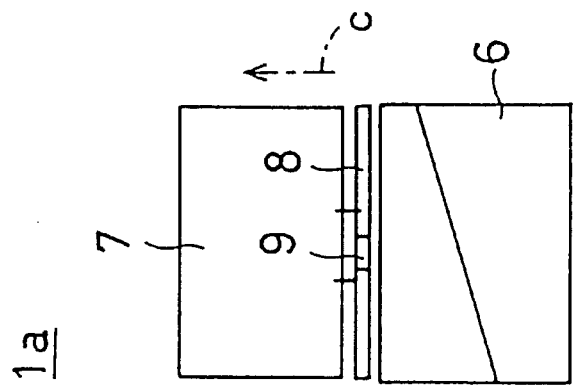
FIGS. 11A to 11C are views for explaining the adjustment of the rotary head drum in a zenith direction.
Figure 11B:
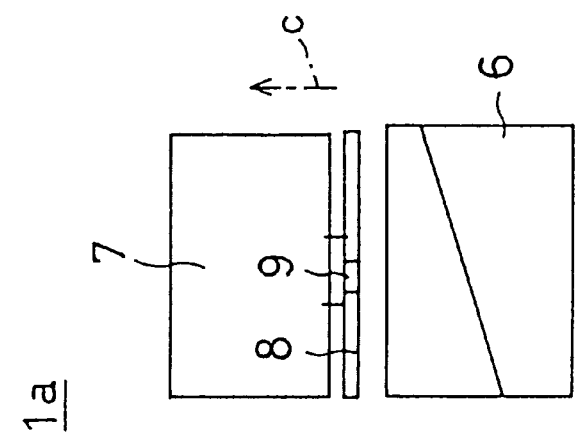

As a result, as shown in FIG. 11A showing the supporting portion 5 of FIG. 9B from the opposite side of the paper as the rotary head drum 1a, when the stationary upper drum 7 is displaced in the direction indicated by the arrow c by the piezoelectric actuator 62 in a state where the stationary upper drum 7 is horizontal, as shown in FIG. 11B, the rotating drum 8 integrally formed with the rotary shaft 44 of the stationary upper drum 7 is also inclined in the direction indicated by the arrow c together with the stationary upper drum 7. As a result, the path of the magnetic head 9 affixed to the rotating drum 8 can be displaced upward with respect to the magnetic tape coming into sliding contact with the circumferential surface of the stationary upper drum 7 and the stationary lower drum 6.

Figure 11C:
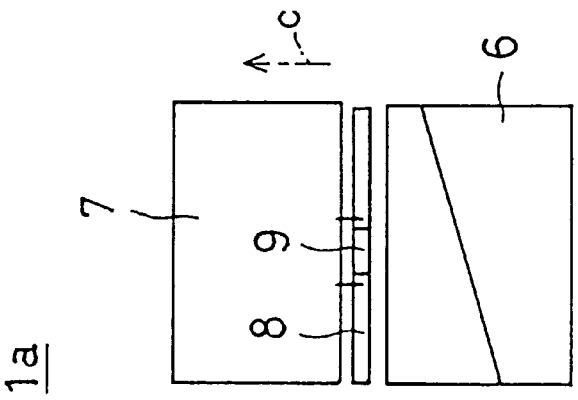

Further, when the stationary upper drum 7 is displaced in the direction reverse to the arrow c by the piezoelectric actuator 62, as shown in FIG. 11C, the rotating drum 8 integrally formed with the rotary shaft 44 of the stationary upper drum 7 is also inclined in the direction reverse to the arrow c together with the stationary upper drum 7. As a result, the path of the magnetic head 9 affixed to the rotating drum 8 can be displaced downward with respect to the magnetic tape coming into sliding contact with the circumferential surface of the stationary upper drum 7 and the stationary lower drum 6.

In this way, by adjusting the amount of expansion and contraction of the piezoelectric actuator 62, the scanning path of the magnetic head 9 with respect to the magnetic tape can be moved parallel to the vertical direction (zenith direction). Below, such an adjustment to the zenith direction will be referred to as adjustment of the degree of vertical displacement.

Figure 12:
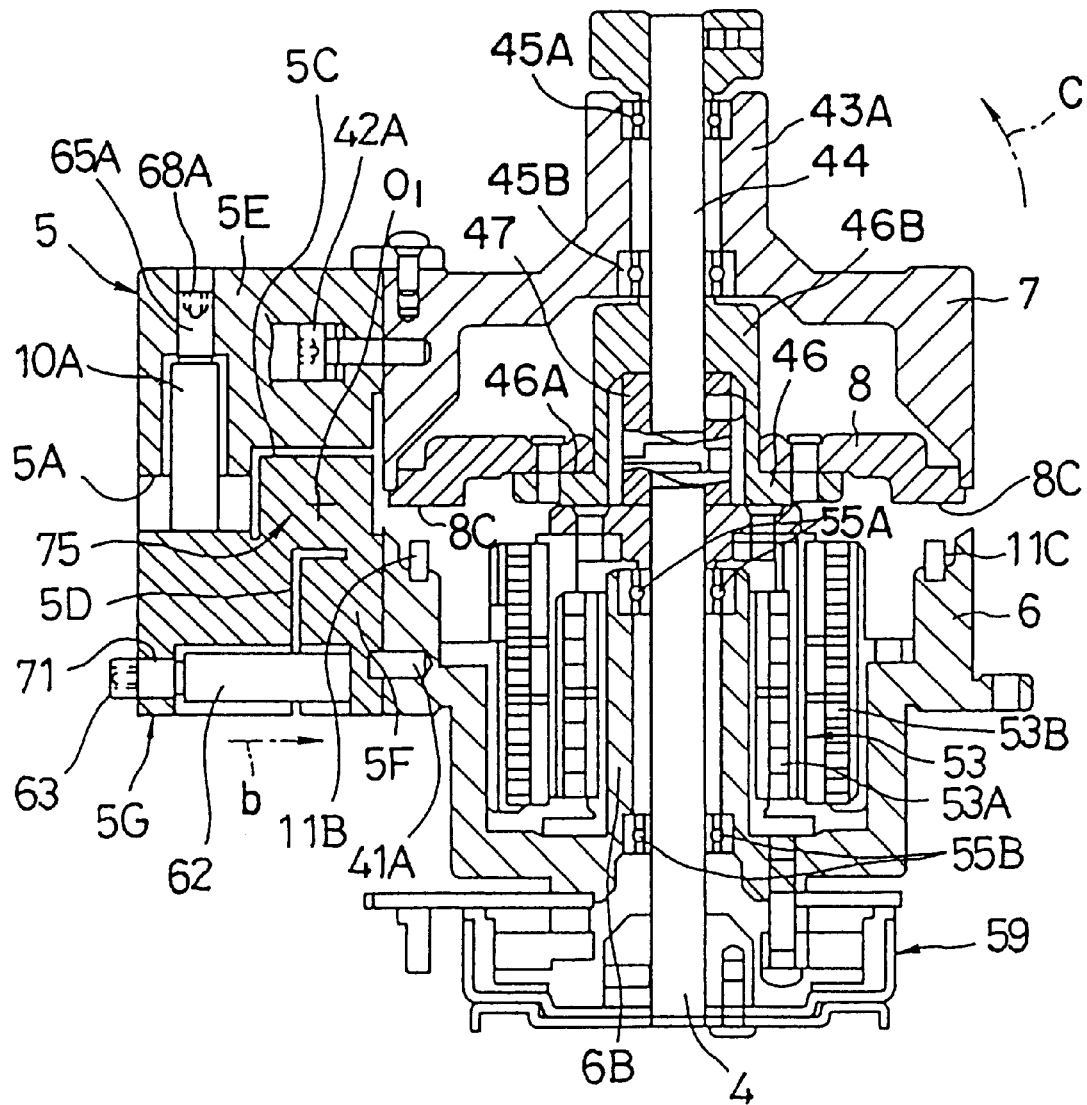
FIG. 12 is a view of the configuration of a distance sensor of the rotary head drum.

Further, in the lower surface 8C of the rotating drum 8 of the rotary head drum 1a, the region in which the magnetic head 9 is not disposed is subjected to processing to give it a mirror surface. At a position opposite to the lower surface 8C of the stationary lower drum 6, as shown in FIG. 12, the above distance sensor 11B is affixed. This distance sensor 11B comprises a laser diode emitting a laser beam to the lower surface 8C of the rotating drum 8 and a light receiving unit which receives the reflected laser beam reflected at the lower surface 8C and detects the distance between the distance sensor 11B and the lower surface 8C in accordance with the position where the light is received. This distance sensor 11B outputs the voltage level in accordance with the position at which the reflected laser beam is received that is, the distance between the distance sensor 11B and the lower surface 8C, as the detection output.

This rotary head drum 1a is provided with distance sensors 11A and 11C having the same configuration as that of the distance sensor 11B. The distance sensors 11A to 11C are arranged so that, as shown in FIG. 9A showing the upper surface of the rotary head drum 1a, the distance sensors 11B and 11C are arranged at the center of rotation of the rotating drum 8, that is, on the straight line passing through the rotary shaft 44, and the distance sensor 11A is arranged at a position away from the distance sensors 11B and 11C by an interval of 90 degrees.

Further, the connection portion 69 of the supporting portion 5 shown in FIG. 8 stands on the straight line passing through the distance sensors 11B and 11C. Due to this, where azimuth adjustment is carried out for the rotating drum 8 by the piezoelectric actuators 10A and 10B and the rotating drum 8 is displaced in the azimuth direction, the detection output of the distance sensors 11B and 11C does not change. The detection output of the distance sensors 11B and 11C changes where the rotating drum 8 is subjected to zenith adjustment (adjustment of degree of vertical displacement) by the piezoelectric actuator 62 and where the rotating drum 8 is displaced in the zenith direction.

Further, the detection output of the distance sensor 11A is changed in a case where the rotating drum 8 is subjected to azimuth adjustment (adjustment of degree of horizontality) by the piezoelectric actuator 62 and where the rotating drum 8 is displaced in the azimuth direction.

Accordingly, only the displacement of the rotating drum 8 in the zenith direction can be detected by the detection output of the distance sensors 11B and 11C and, at the same time, only the displacement of the rotating drum 8 in the azimuth direction, that is, the degree of horizontality, can be detected by the detection output of the distance sensor 11A.

Next, an explanation will be made of the operation of the digital VTR according to the present embodiment together with the operation of such a rotary head drum 1a referring to FIG. 6.

First, when recording an image, video data or a video signal is supplied from the outside to the recording system 2. Where a video signal is supplied from the outside, the video signal is supplied to the A/D conversion unit 21. The A/D conversion unit 21 performs the A/D conversion for the supplied video signal to form the video data and supplies the formed video data to the switching unit 22. On the other hand, where video data is supplied from the outside, the video data is supplied to the switching unit 22.

The switching unit 22 switches between the video data from the A/D conversion unit 21 and the video data from the outside and supplies the result to the buffer 23. Due to this, the video data obtained by performing the A/D conversion on the video signal or the video data supplied from the outside is stored in the buffer 23.

The system synchronization generation unit 27 extracts the synchronization information from the video data or video signal supplied from the outside and generates a system synchronization signal for performing the control of the entire apparatus in accordance with this synchronization information. This system synchronization signal is used for the control of the rotational speed of the magnetic head 9 etc. by for example the above system controller 12. The coding unit 24 reads a predetermined recording unit's worth of video data from the buffer 23 at every predetermined time interval in synchronization with the system synchronization signal from for example the system synchronization generation unit 26, performs processing such as addition of parity for error correction to the read video data to code the same, and supplies the result to the synchronization generation unit 25. The synchronization generation unit 25 adds the synchronization information etc. to the coded video data from the coding unit 24 and alternately supplies the same to the modulation units 26A and 26B every predetermined recording unit.

The modulation units 26A and 26B perform 8-16 modulation on the respectively supplied video data to form the recording data when the predetermined unit's worth of the video data is supplied from the synchronization generation unit 25 and supplies the formed recording data to the switching unit 16. Due to this, the recording data from the modulation units 26A and 26B are alternately supplied to the switching unit 16. The switching unit 16 supplies the recording data from the modulation unit 26A to one magnetic head 9 and supplies the recording data from the modulation unit 26B to the other magnetic head 9.

On the other hand, the system controller 12 controls the travel control unit 4 to makes the magnetic tape travel in the forward (FWD) direction or the reverse (REV) direction at a constant speed when recording an image. At the same time, the system controller 12 controls the drive motor 59 based on the synchronization information output from the system synchronization generation unit 27 to rotate the rotating drum 8 at a constant rotational speed.

Figure 3:
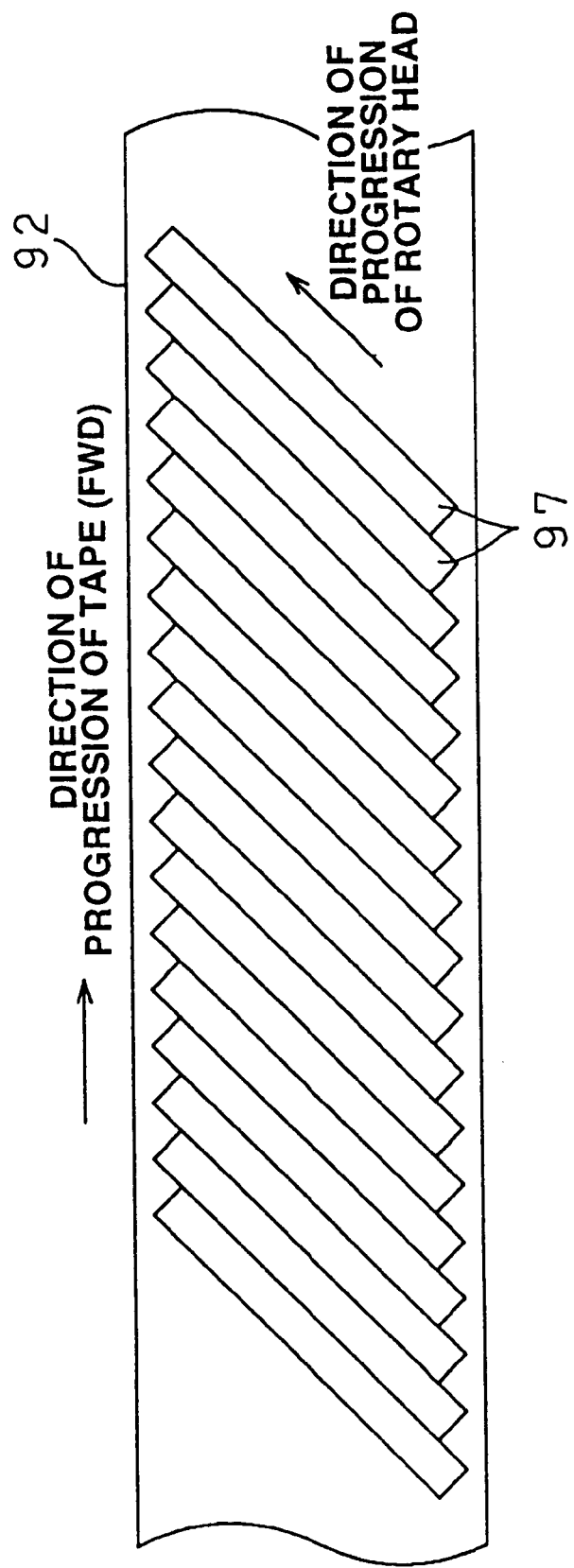
FIG. 3 is a view of a recording format of a conventional digital VTR.
Figure 4:
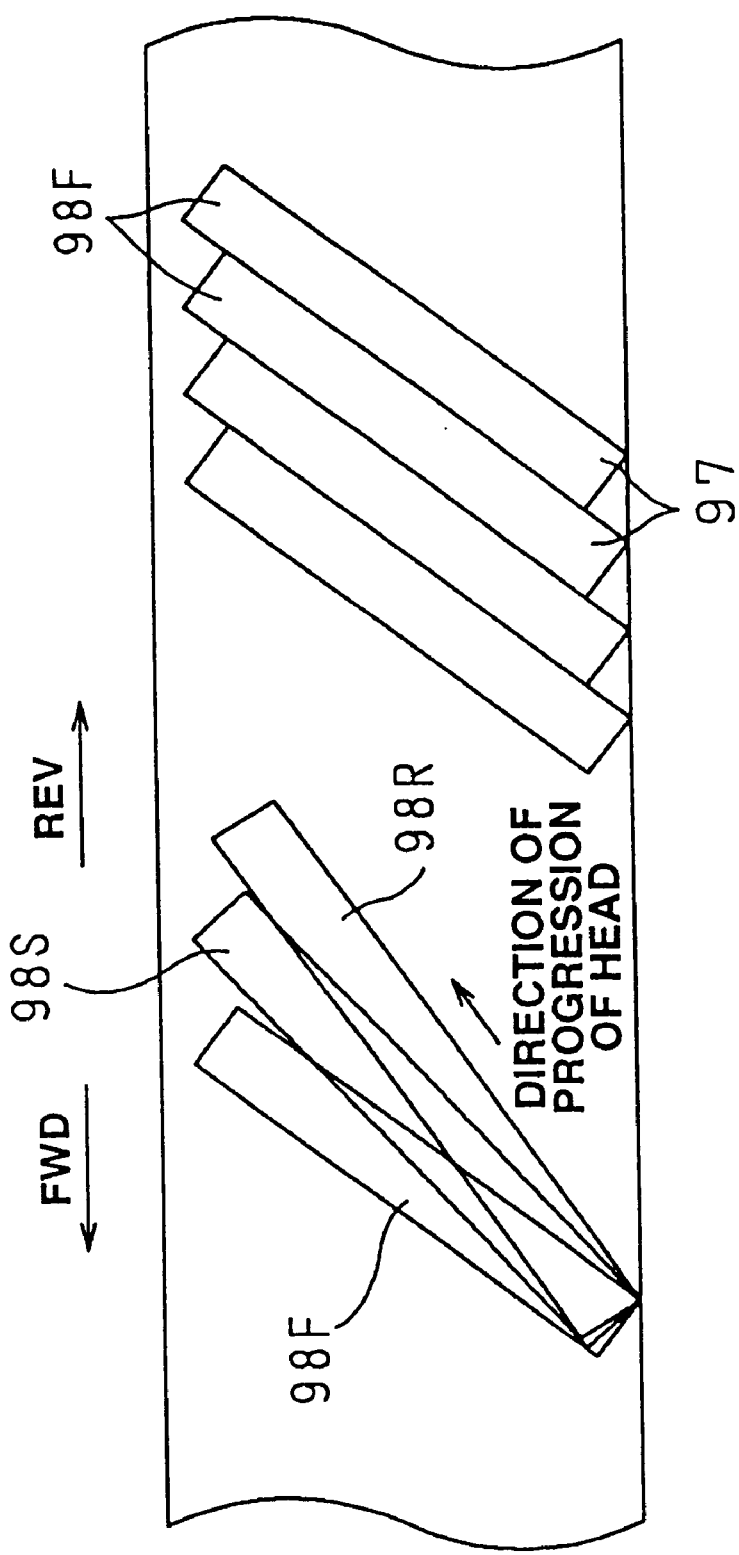
FIG. 4 is a view explaining the recording operation of a conventional digital VTR.
Figure 5A:
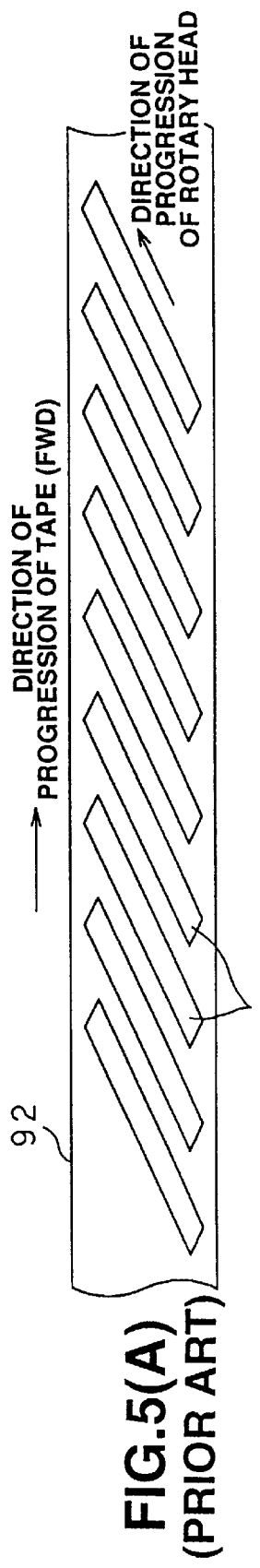
FIGS. 5A to 5C are views explaining the recording operation of a conventional digital VTR.
Figure 5B:
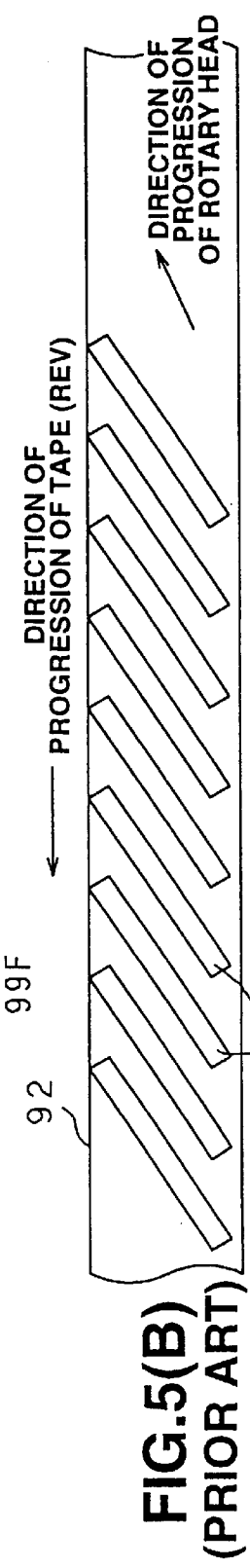
Figure 5C:
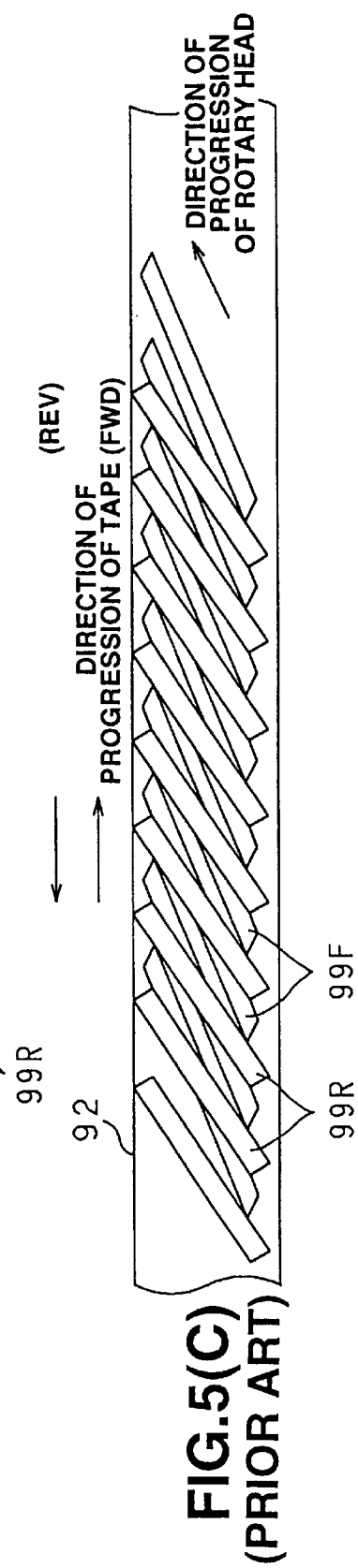

The relationship between the speed of travel of this magnetic tape and the rotational speed of the rotating drum 8 is set so that during ½ rotation of the rotating drum 8, that is, during a period where one recording track's worth of recording is carried out by one magnetic head 9, the magnetic tape travels by the amount of two recording tracks. Namely, the ratio between the speed of travel of the magnetic tape and the rotational speed of the rotating drum 8 in this case becomes 2 to 1 when defining the ratio when the recording tracks are formed without gaps as shown in FIG. 3 is 1 to 1. When the recording is carried out by the magnetic head 9 in such a state, the FWD direction or the REV direction recording tracks are formed on the magnetic tape every other track. At this time, the rotating drum 8 is controlled by the system controller 12 so as to rotate in synchronization with the synchronization information so that the starting point of the signal recording by the magnetic head 9 is always located at a constant position on one end of the recording tracks.

Further, in the system controller 12, a control signal CTL is generated based on the synchronization information of the output of the system synchronization generation unit 27. This CTL signal is a pulse signal with a duty ratio of 50% having a cycle corresponding to the interval of the starting point of the signal recording by the magnetic head 9 in one direction (FWD direction or the REV direction). The CTL signal is supplied to the CTL head 80, which is the head for performing the recording and reproduction of this signal, and recorded on the control track (CTL track) provided in the longitudinal direction of the magnetic tape 92.

Where the magnetic tape is made to travel in the FWD direction to record the video data, the rotation of the magnetic head 9 and the travel of the magnetic tape 92 are controlled by the system controller 12 so that the rising edge of the CTL signal is in synchronization with the starting point of the signal recording by the magnetic head 9.

Note that, where recording in the REV direction following the recording in the FWD direction, the rotation of the magnetic head 9 and the travel of the magnetic tape 92 are controlled by the system controller 12 so that the rising edge of the reproduced CTL signal obtained by reproduction by the CTL head is in synchronization with the starting point of the signal recording by the magnetic head 9.

Further, where the magnetic tape is made to travel in the FWD direction to newly carry out recording, the rotation of the magnetic head 9 and the travel of the magnetic tape 92 are controlled by the system controller 12 so that the rising edge of the CTL signal (not the reproduced CTL signal) is in synchronization with the starting point of the signal recording by the magnetic head 9.

Note that, when recording in the FWD direction following the recording in the REV direction, the rotation of the magnetic head 9 and the travel of the magnetic tape 92 are controlled by the system controller 12 so that the rising edge of the reproduced CTL signal obtained by reproduction by the CTL head is in synchronization with the starting point of the signal recording by the magnetic head 9.

Further, the system controller 12 instructs the reference voltage generation unit 13 to generate the reference voltage in accordance with the predetermined angle of inclination corresponding to the direction of travel in accordance with the direction of travel of the magnetic tape.

The reference voltage generation unit 13 generates a first reference voltage for controlling the piezoelectric actuator 10A and a second reference voltage for controlling the piezoelectric actuator 10B in accordance with the angle of inclination instructed by the system controller 12, supplies the first reference voltage to the non-inverted input of the differential amplifier 14A, and supplies the second reference voltage to the non-inverted input of the differential amplifier 14B.

The differential amplifier 14A finds a difference between the first reference voltage and the detection output of the distance sensor 11A and supplies the found difference signal as the driving voltage to the piezoelectric actuator 10A via the differential amplifier 15A. On the other hand, the differential amplifier 14B finds the difference between the second reference voltage and the detection output of the distance sensor 11B and supplies the found difference signal as the driving voltage to the piezoelectric actuator 10B via the differential amplifier 15B.

Then, when the piezoelectric actuators 10A and 10B are made to expand or contract in accordance with the supplied driving voltage, the angle of inclination between the upper drum affixing portion 5E and the lower drum affixing portion 5F is changed and the detection outputs of the distance sensors 11A and 11B change in accordance with this.

When the detection output of the distance sensors 11A and 11B changes, the level of the difference signal from the differential amplifiers 14A and 14B is lowered, and the driving voltage supplied to the piezoelectric actuators 10A and 10B is lowered. Then, when the angle of inclination between the upper drum affixing portion 5E and the lower drum affixing portion 5F becomes the predetermined angle of inclination, the differences between the detection output of the distance sensors 11A and 11B and the first and second reference voltages become 0 and the driving of the piezoelectric actuators 10A and 10B is ended.

Due to this, the angle of inclination of the upper drum affixing portion 5E is controlled in accordance with the first and second reference voltages, and the angle of inclination of the stationary upper drum 7 affixed to the upper drum affixing portion 5E is controlled. Due to this, the angle of inclination of the rotating drum 8 rotatably attached to the stationary upper drum 7 is controlled.

Figure 13:
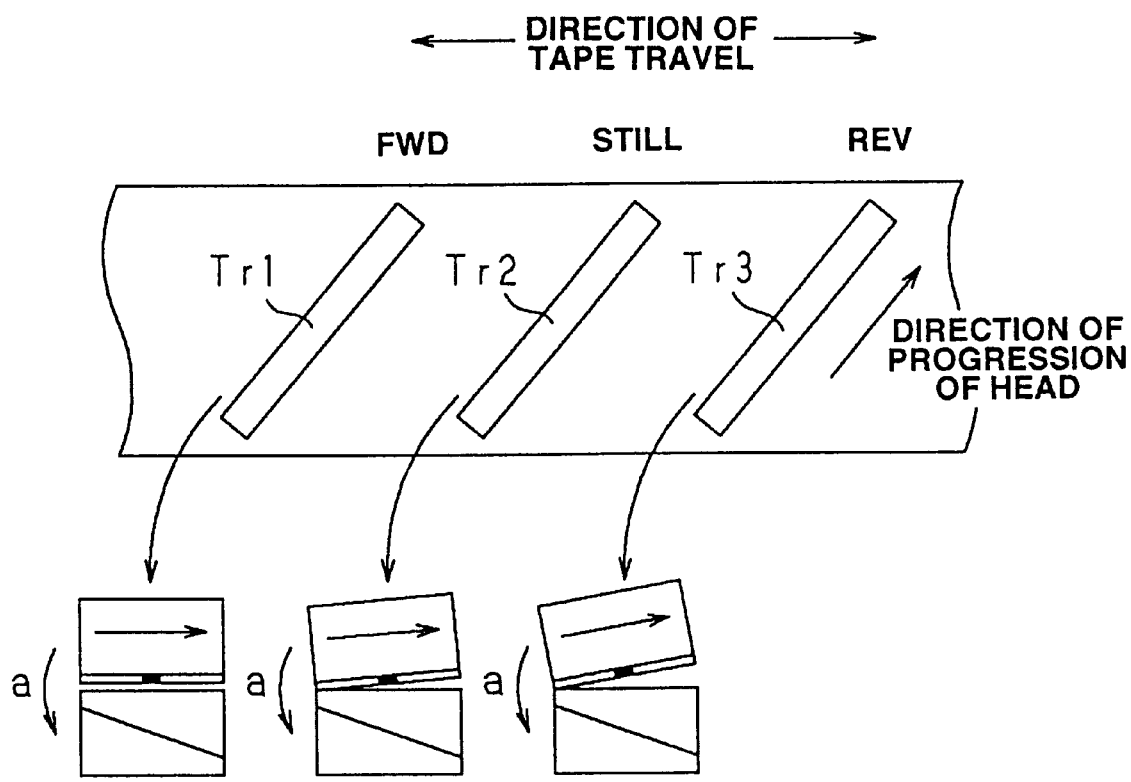
FIG. 13 is a view explaining the control operation of an angle of inclination of a rotary head portion in a digital VTR.
Figure 14A:
FIGS. 14A to 14C are view of recording tracks formed by the digital VTR.

Namely, when recording in the FWD direction on the magnetic tape, if the operator instructs the start of the recording in the FWD direction to the system controller 12, the system controller 12 controls the travel control unit 4 to make the magnetic tape travel in the FWD direction and, at the same time, controls the reference voltage generation unit 13 and performs the recording bringing the stationary upper drum 7 into the horizontal state as shown in FIG. 13. At this time, the magnetic head 9 scans the magnetic tape along the path Tr1 having the predetermined angle of inclination. Accordingly, by performing such recording, as shown in FIG. 14A, recording tracks having a predetermined angle of inclination are formed on the magnetic tape every other track.

Further, where the travel of the magnetic tape is stopped and recording on one recording track (still recording), the system controller 12 controls the reference voltage generation unit 13 so as to, as shown in FIG. 13, cause the contraction of the piezoelectric actuator 10A and cause the expansion of the piezoelectric actuator 10B and perform the recording while inclining the stationary upper drum 7 in the direction indicated by the arrow a. At this time, the magnetic head 9 scans the magnetic tape along the path Tr2 having the same angle of inclination as that at the recording in the FWD direction. Due to this, on the magnetic tape, recording tracks having the same angle of inclination as that of the recording tracks in the FWD direction are formed.

Figure 14B:
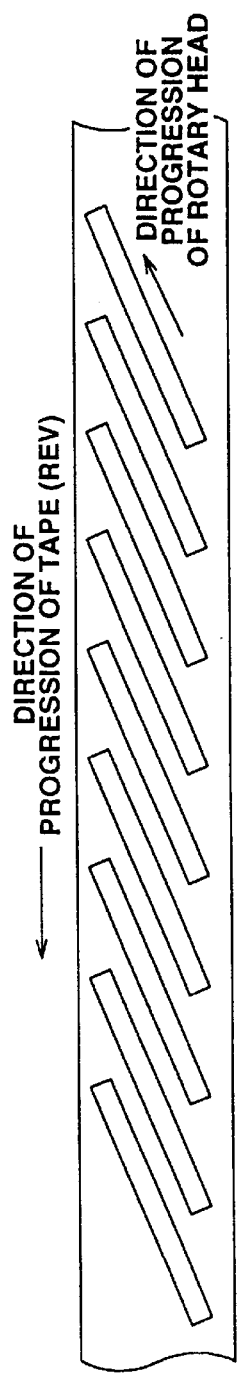

Further, when recording in the REV direction following recording in the FWD direction on the magnetic tape, when the operator instructs the system controller 12 to start the recording in the REV direction,, the system controller 12 controls the travel control unit 4 to make the magnetic tape travel in the REV direction. At this time, the system controller 12 controls the rotational speed of the rotating drum 8 so that the rising edge of the reproduced CTL signal is in synchronization with the starting point of the signal recording by the magnetic head 9. Further, together with this, the system controller 12 controls the reference voltage generation unit 13 to further incline the stationary upper drum 7 in the direction indicated by the arrow a, as shown in FIG. 8, compared with the case where performing still recording and then performs the recording. At this time, the magnetic head 9 scans the magnetic tape along the path Tr3 having the same angle of inclination as that at the recording of the FWD direction. Accordingly, by performing such recording, as shown in FIG. 14B, recording tracks having the same angle of inclination as that of the recording tracks of the FWD direction are formed on the magnetic tape every other track.

Figure 14C:
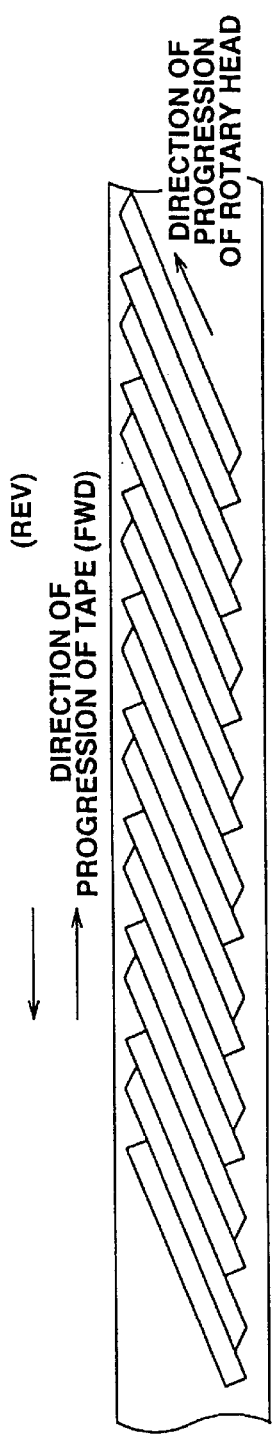

Namely, after the recording in the FWD direction or REV direction is carried out as mentioned above, when the direction of travel of the magnetic tape is reversed by the travel control unit 4 and then recording in the other direction is carried out, as shown in FIG. 14C, the recording tracks of the FWD direction or REV direction are formed between the recording tracks of the other direction.

Thus, in this digital. VTR, when performing recording in the FWD direction and REV direction, the recording tracks are formed at every other track (every other N number of tracks if there are a plurality of N number of head gaps in one magnetic head). At the same time, the angles of inclination of the recording tracks of the FWD direction and REV direction are brought into coincidence with each other. Therefore, it is possible to prevent the recording tracks of the FWD direction and REV direction from being superimposed on each other and therefore possible to reciprocally record video data.

In this digital VTR, since reciprocal recording can be carried out, the recording can be started from any position of the magnetic tape without a necessity of rewinding. Further, after the recording in one direction is ended, the direction of travel of the magnetic tape is reversed, so recording in the other direction can be successively carried out and therefore recording for a predetermined recording time as determined by the tape length can be carried out.

Next, when reproducing from a magnetic tape on which video data is recorded as mentioned above, the system controller 12 controls the travel control unit 4 to make the magnetic tape travel at the same speed as that at the recording in the FWD direction or the REV direction based on the CTL signal obtained by the reproduction by the CTL head 80 and, at the same time, rotates the rotating drum 8 at the same speed as that at the recording. Further, the system controller 12 changes the inclination of the stationary upper drum 7 as shown in FIG. 13 in accordance with the direction of travel of the tape in the same way as the time of the recording. Due to this, the magnetic head 9 scans the recording tracks formed at every other track as in the above way. Each magnetic head 9 selectively reproduces from the recording track of the FWD direction or REV direction based on the edge of the CTL signal reproduced by the CTL head 80 and sequentially supplies the reproduced signals of the recording track to the switching unit 16.

When the reproduced signals are supplied from the magnetic heads 9, the switching unit 16 supplies the reproduced signal from one magnetic head 9 to the demodulation unit 31A and supplies the reproduced signal from the other magnetic head 9 to the demodulation unit 31B.

The demodulation units 31A and 31B provide a so-called phase locked loop circuit (hereinafter referred to as PLL circuit), which PLL circuit reproduces the clock of the reproduced signal from the magnetic heads 9. Then, processing such as binary-coding and 8-16 demodulation is carried out on the reproduced signal according to the reproduced clock to form reproduced data. The reproduced data are sequentially supplied to the memory 32. In this way, by reproducing the clock of the reproduced signal and demodulating the reproduced signal according to the reproduced clock, even in a case where the clock frequency of the reproduced signal fluctuates due to jitter, the reproduced signal can be reliably demodulated according to the fluctuated clock frequency.

On the other hand, the decoding unit 33 generates a predetermined clock, reads the reproduced data stored in the memory 32 according to this clock, decodes this reproduced data, performs processing such as error correction, then sequentially supplies the resultant data to the buffer 34. Due to this, the reproduced data is read at the predetermined data rate. The processing unit 35 reads the reproduced data held in the buffer 34, performs the processing for this reproduced data, and outputs the result as the video data and, at the same time, supplies the video data to the D/A conversion unit 36. The D/A conversion unit 36 performs D/A conversion on the video data from the processing unit 35 to form the video signal and outputs the result.

The data recorded on the recording tracks of the FWD direction or REV direction of the magnetic tape is reproduced and the video data and video signal based on the reproduced data are output in this way.

Note that, at the time of recording, it is also possible to provide a reproduction magnetic head for performing reproduction from the recording tracks on which data has been already recorded, reproduce from the recording tracks by the reproduction magnetic head preceding the scan by the recording magnetic head, detect the recording tracks of the FWD direction and the recording tracks of the REV direction, and thereby control the travel of the magnetic tape etc.

Alternatively, at the time of recording, it is also possible to record in the memory the positions of the recording tracks on which the recording is carried out, the track numbers, etc. and, at later recording, control the travel of the magnetic tape etc. based on the positions of the recording tracks, track numbers, etc. stored in the memory.

Due to this, it is possible to record on recording tracks of the FWD direction or REV direction between the recording tracks of the other direction. Also, when recording on the recording tracks of the FWD direction or REV direction, it is possible to prevent overwriting of the recording tracks in the other direction.

Further, when the magnetic tape is made to travel in the FWD direction or REV direction at the time of reproduction at the same speed as that at the time of recording and the recording tracks of the FWD direction or REV direction are reproduced from, reverse reproduction of video data becomes possible.

Note that, in the first embodiment, to bring the angles of inclination of the recording tracks of the FWD direction and REV direction into coincidence with each other, the angle of inclination of the scanning path Tr3 of the magnetic head 9 at the time of recording in the REV direction shown in FIG. 13 is brought into coincidence with the angle of inclination of the scanning path Tr1 of the magnetic head 9 at the time of recording in the FWD direction and, at the same time, the angle of inclination of the stationary upper drum 7 when recording in the FWD direction is set so that the stationary upper drum 7 becomes horizontal with respect to the stationary lower drum 6 and accordingly the angle of inclination of the stationary upper drum 7 when recording in the REV direction becomes large.

For this reason, the angle of inclination of the stationary upper drum 7 is controlled only in one direction and the symmetry of the angles of inclination of the stationary upper drum 7 when recording in the FWD direction and recording in the REV direction disappears, so there is an apprehension that the design of the mechanism of the piezoelectric actuators 10A and 10B etc. will be limited. Further, there is an apprehension that when recording in the REV direction, the angle of inclination of the stationary upper drum 7 will become large, the contact between the magnetic tape and the magnetic head 9 will become nonuniform, and the recording and reproduction characteristics in the FWD direction are apt to differ from those in the REV direction.

For this reason, the digital VTR according to the second embodiment of the present invention is configured so that the angles of inclination of the stationary upper drum 7 when recording in the FWD direction and when recording in the REV direction become symmetrical. Note that, this digital VTR of the second embodiment has the same configuration as that of the digital VTR of the first embodiment shown in FIG. 6 except for the rotary head portion. For this reason, an explanation is omitted for the portions overlapping the digital VTR of the first embodiment. The explanation will be made below for just the portion different from the digital VTR of the first embodiment.

Figure 15:
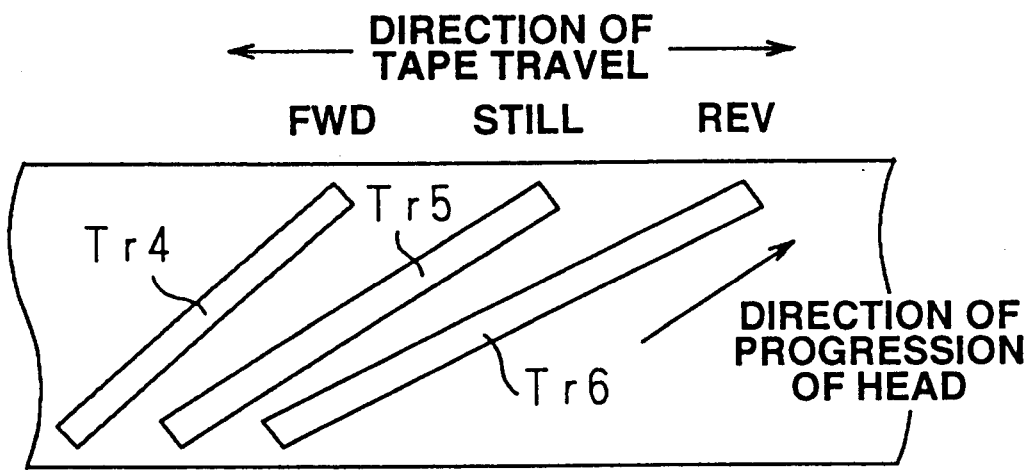
FIG. 15 is a view for explaining the operation of a second embodiment in which the recording apparatus according to the present invention is applied to a digital VTR.
Figure 16:
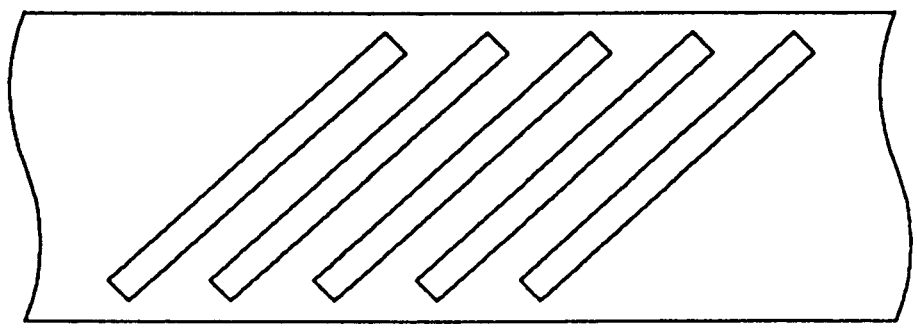
FIG. 16 is a view of the recording format of a digital VTR.

In the digital VTR according to the second embodiment, as shown in FIG. 15, control is performed so that the scanning path of the head 9 having one head gap on the magnetic tape when recording in the FWD direction becomes the path Tr4 having the same angle of inclination as the angle of inclination of the recording track when the travel of the magnetic tape is stopped in a state where the stationary upper drum 7 is made horizontal with respect to the stationary lower drum 6 and still recording is performed (hereinafter, simply referred to as a still recording angle). In such a state, when the rotating drum 8 is rotated at the same rotational speed as that for the first embodiment and the recording in the FWD direction is carried out, as shown in FIG. 16, recording tracks having such a still recording angle are formed in the direction of travel of the magnetic tape at every other track (every other N number of tracks when the magnetic head 9 has a plurality of N number of head gaps).

Note that, in such a state, where the angle of inclination of the stationary upper drum 7 is fixed and the travel of the tape is stopped or carried out in the REV direction, the scanning path of the magnetic head 9 on the magnetic tape becomes the path Tr5 or Tr6 having a further smaller angle of inclination than the still recording angle as shown in FIG. 15.

For this reason, in this digital VTR, similar to the digital VTR according to the first embodiment, the angles of inclination of the stationary drum when recording in the FWD direction and when recording in the REV direction are changed to bring the angles of inclination of the recording tracks to be formed into coincidence with each other.

Figure 17:
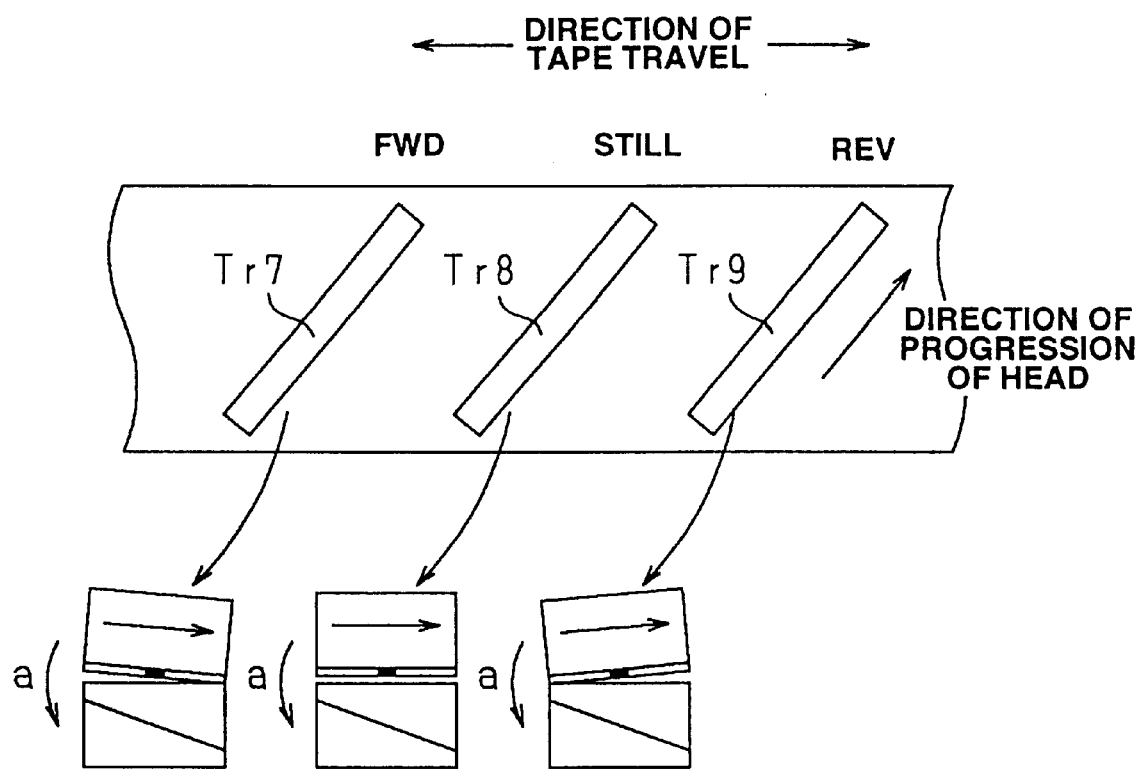
FIG. 17 is a view explaining the control operation of the angle of inclination of the rotary head portion in a digital VTR.
Figure 18:
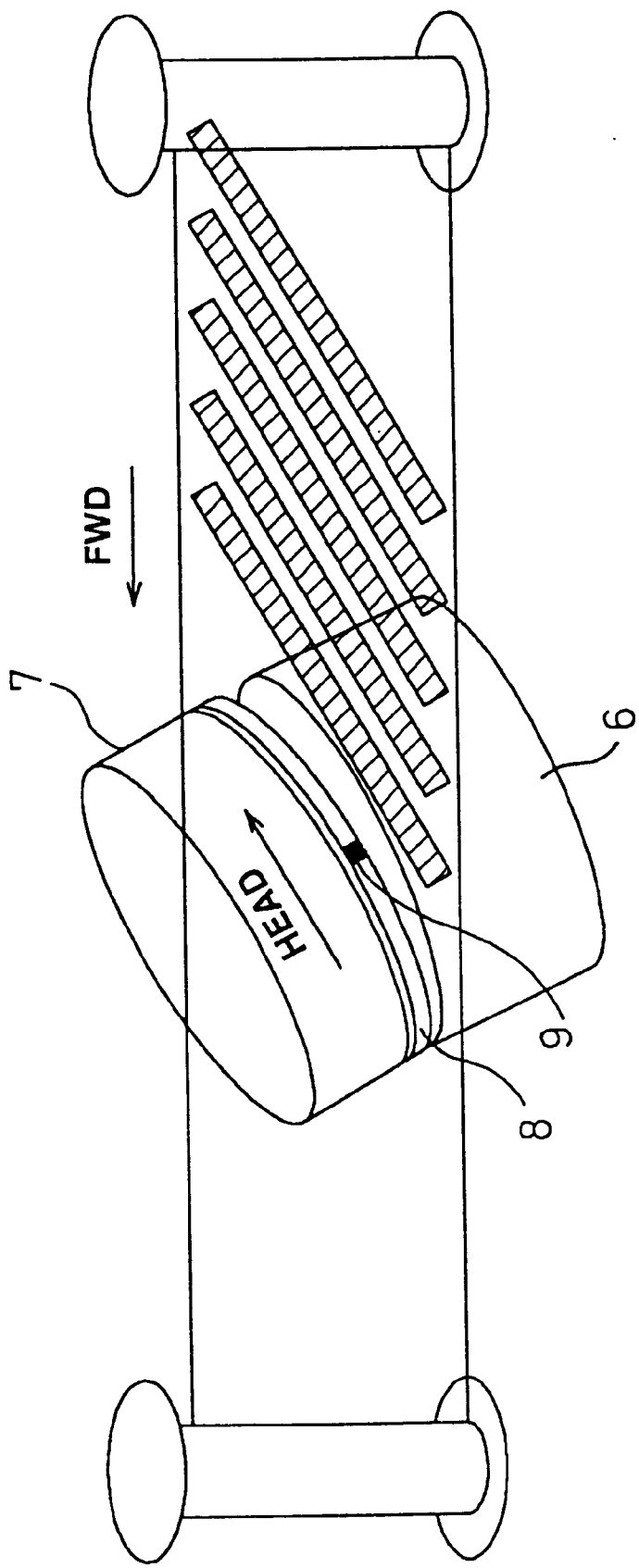
FIG. 18 is a view of a FWD direction recording operation of a digital VTR.

Namely, when recording in the FWD direction on the magnetic tape, the system controller 12 controls the reference voltage generation unit 13 to cause the expansion of the piezoelectric actuator 10A and cause the contraction of the piezoelectric actuator 10B and thereby perform the recording while inclining the stationary upper drum 7 in the direction reverse to the arrow a as shown in FIG. 17. At this time, the magnetic head 9 scans the magnetic tape along the path Tr7 having the same angle of inclination as the still recording angle. Accordingly, by performing such recording, as shown in FIG. 18, recording tracks of the FWD direction having the still recording angle are formed at every other track similar to the first embodiment.

Further, when performing still recording on the magnetic tape, the system controller 12 controls the reference voltage generation unit 13 to bring the stationary upper drum 7 into a horizontal state with the stationary lower drum 6 as shown in FIG. 17 and then performs the recording. At this time, the magnetic head 9 scans the magnetic tape along the path Tr8 having a still recording angle. Due to this, on the magnetic tape, recording tracks having the still recording angle are formed similar to the recording tracks of the FWD direction.

Further, when recording in the REV direction on the magnetic tape, the system controller 12 controls the reference voltage generation unit 13 to cause the contraction of the piezoelectric actuator 10A and cause the expansion of the piezoelectric actuator 10B so as to incline the stationary upper drum 7 in the direction indicated by the arrow a as shown in FIG. 12 and then performs the recording. At this time, the magnetic head 9 scans the magnetic tape along the path Tr9 having the still recording angle. Due to this, recording tracks having the still recording angle are formed on the magnetic tape at every other track similar to the recording tracks in the FWD direction.

Figure 19:
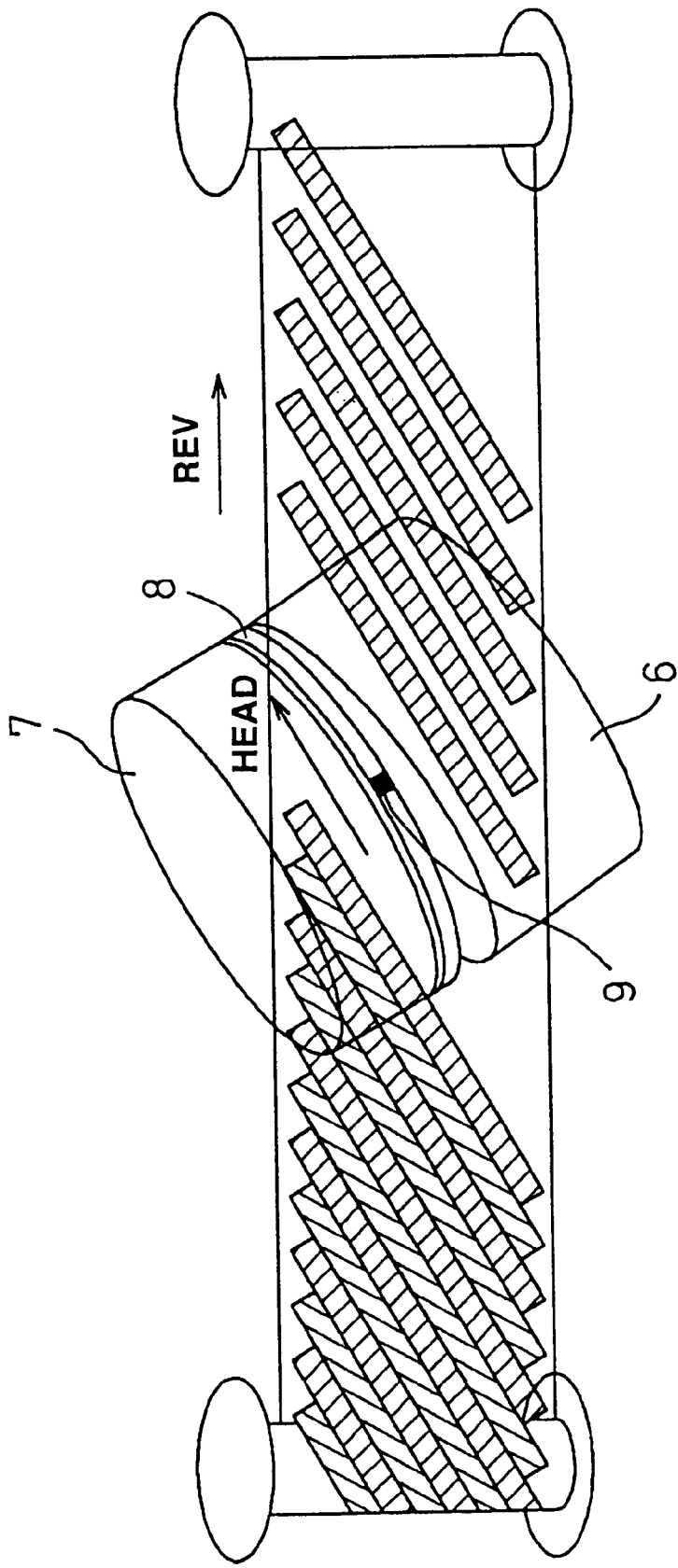
FIG. 19 is a view of a REV direction recording operation of a digital VTR.

After the recording in the FWD direction, such recording in REV direction is carried out, so the recording tracks of the REV direction are formed on the magnetic tape between the recording tracks of the FWD direction as shown in FIG. 19.

Note that, in the second embodiment, when the magnetic tape is made to travel in the FWD direction or the REV direction for the recording, similar to the first embodiment, the rotation of the magnetic head 9 and the travel of the magnetic tape 92 are controlled by the system controller 12 so that the edge of the CTL signal or the reproduced CTL signal is in synchronization with the starting point of the signal recording by the magnetic head 9.

Thus, in this digital VTR, when recording in the FWD direction and REV direction, recording tracks are formed at every other track (every other N number of tracks where one magnetic head has a plurality of N head gaps). At the same time, the angles of inclination of the recording tracks of the FWD direction and REV direction are brought into coincidence with each other. Therefore, the superimposition of the recording tracks of the FWD direction and REV direction can be prevented and video data can be reciprocally recorded.

In this digital VTR, as mentioned above, when still recording is carried out, the stationary upper drum 7 is made horizontal with respect to the stationary lower drum 6. Further, the state where the stationary upper drum 7 becomes horizontal with respect to the stationary lower drum 6 becomes the center of the control range of the angle of inclination. When recording in the FWD direction, the angle of inclination of the stationary upper drum 7 is changed in the reverse direction to the arrow a in FIG. 17, and when recording in the REV direction, the angle of inclination of the stationary upper drum 7 is changed in the direction indicated by the arrow a in FIG. 17 and then the recording carried out. For this reason, in this digital VTR, the angle of inclination of the stationary upper drum 7 when recording in the FWD direction and the angle of inclination of the stationary upper drum 7 when recording in the REV direction become symmetrical.

The mechanical loads applied to the connection portion 69 of the upper drum affixing portion 5E to which the stationary upper drum 7 is affixed and the lower drum affixing portion 5F to which the stationary lower drum 6 is affixed are determined in accordance with the angle of inclination of the stationary upper drum 7. For this reason, as mentioned above, by making the angles of inclination of the stationary upper drum 7 when recording in the FWD direction and REV direction symmetrical, the mechanical loads of the supporting portion 5 can be made symmetrical, and the design of mechanism can be facilitated.

Further, in this digital VTR, by making the angles of inclination when recordings in the FWD direction and REV direction symmetrical as mentioned above, the contact between the magnetic tape and the magnetic head 9 can be made uniform, the recording and reproduction characteristics of the FWD direction and REV direction can be made uniform, and stable recording and reproduction can be carried out.

Next, in this digital VTR, when reproducing from a magnetic tape on which the video data is recorded as mentioned above, tracking control is performed for controlling the angle of inclination of the stationary upper drum 7 in accordance with the reproduction RF signal of the magnetic head 9 and bringing the scanning path of the magnetic head 9 affixed to the rotating drum 8 into coincidence with the recording tracks on the magnetic tape.

Figure 20:
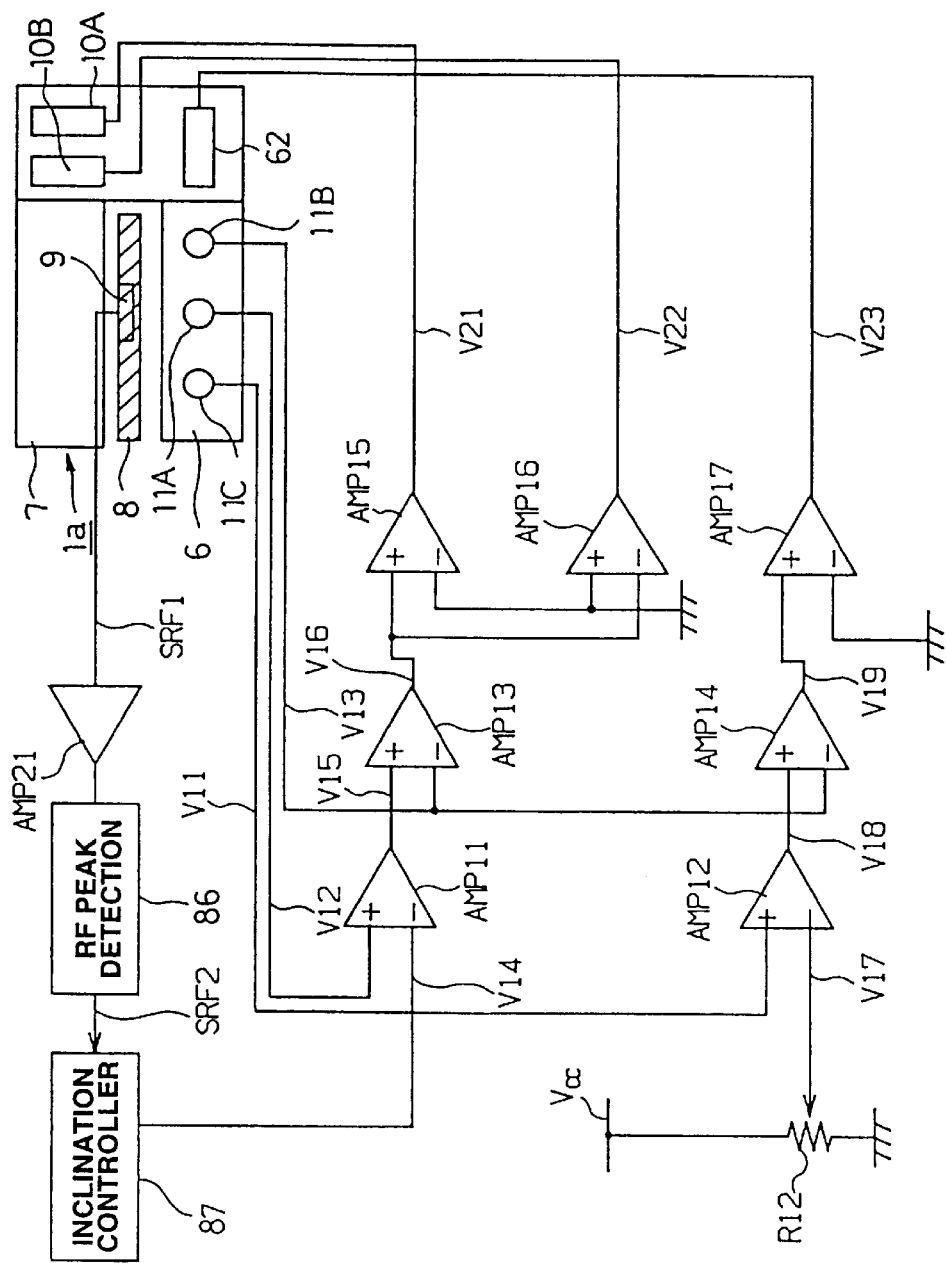
FIG. 20 is a block diagram of the configuration of a rotary head portion of a digital VTR.

For this reason, the rotary head portion 1 of this digital VTR is provided with a preamplifier AMP21 for amplifying the RF output from the magnetic head 9, an RF peak detection unit 86 for detecting the peak of the reproduction RF signal, and an inclination controller 87 as shown in FIG. 20.

Further, this rotary head portion 1 is provided with, as the piezoelectric actuator control unit controlling the piezoelectric actuators 10A, 10B, and 10C, sensor amplifiers AMP11 and AMP12, control amplifiers AMP13 and AMP14, and voltage drivers AMP15, AMP16, and AMP17.

The sensor amplifier AMP11 receives the output of the inclination controller 87 as the inverted input and receives the detection output V12 of the distance sensor 11C as the non-inverted input. The output of this sensor amplifier AMP11 is supplied to the non-inverted input of the control amplifier AMP13.

Further, the control amplifier AMP13 receives the detection output V13 of the distance sensor 11A as the inverted input. The output of this control amplifier AMP13 is supplied to the non-inverted input of the voltage driver AMP15 and the inverted input of the voltage driver AMP16. The ground voltage is respectively supplied to the inverted input of the voltage driver AMP15 and the non-inverted input of the voltage driver AMP 16.

Due to this, the control amplifier AMP13 supplies the difference between the detection output V12 of the distance sensor 11C and the detection output V13 of the distance sensor 11A as the error voltage V16 to the non-inverted input of the voltage driver AMP15 and the inverted input of the voltage driver AMP16.

As a result, the voltage drivers AMP15 and AMP16 operate differentially with respect to the error voltage V16 so driving voltages V21 and V22 causing the expansion of one of the piezoelectric actuators 11A and 11B and, at the same time, causing the contraction of the other are supplied to the piezoelectric actuators 11A and 11B. Thus, by using the height of the distance sensor 11B nearest to the moveable support point $O_2$ with respect to the azimuth direction as the reference, feedback can be supplied so that the detection output of the distance sensor 11A coincides with the detection output of the distance sensor 11B and therefore azimuth adjustment (adjustment of degree of horizontality) of the rotating drum 8 can be carried out.

Here, the reproduced signal obtained via the magnetic head 9 (hereinafter referred to as the reproduction RF signal) SRF1 is input via the preamplifier AMP21 to the RF peak detection circuit 86. The RF peak detection circuit 86 performs the peak detection of the RF signal from the reproduction RF signal SRF1 and supplies the RF peak signal SRF2 to the inclination controller 87.

Figure 21:
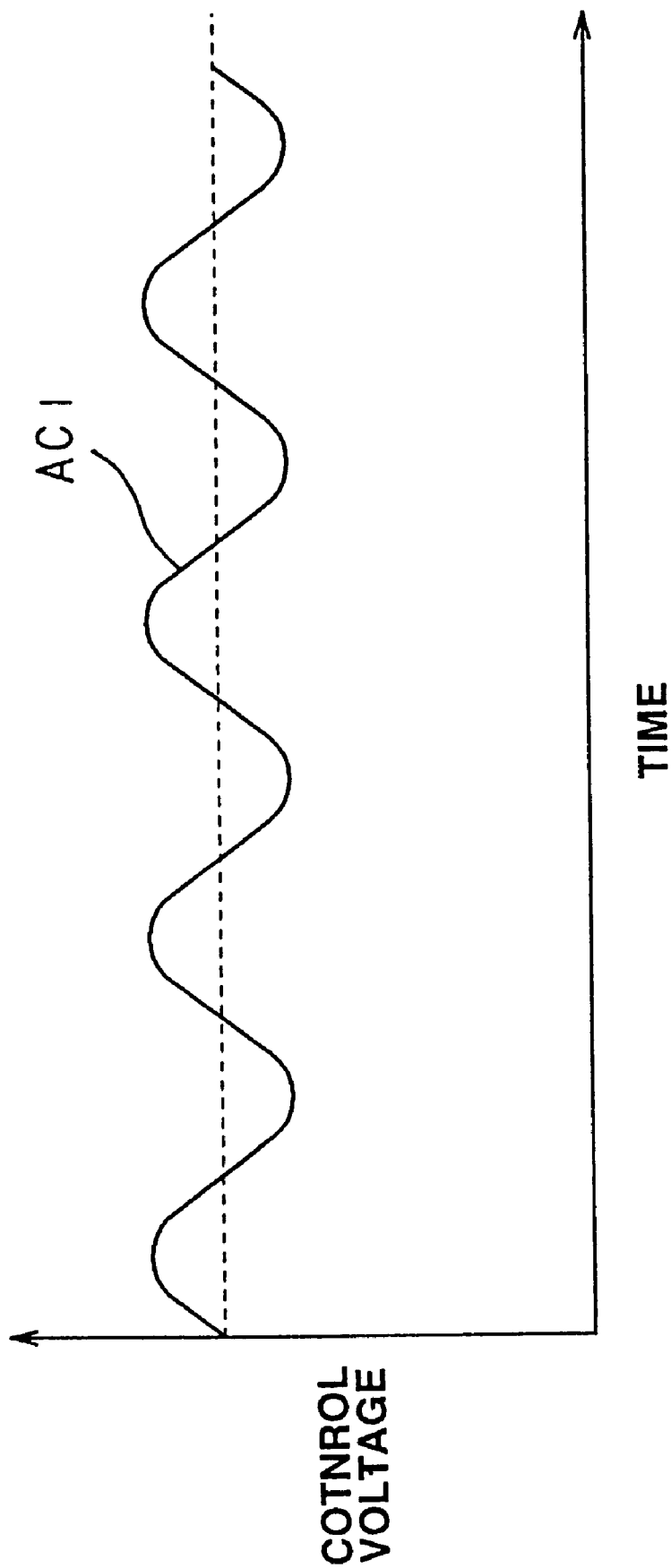
FIG. 21 is a view explaining a tracking control operation of the rotary head portion.

More specifically, an AC signal AC1 as shown in FIG. 21 is superimposed on an offset voltage V14 to be given to the sensor amplifier AMP 11 in the inclination controller 87, the driving voltages V21 and V22 to be given to the piezoelectric actuators 10A and 10B are changed in an AC form, and the piezoelectric actuators 10A and 10B are made to expand or contract in accordance with this, whereby the maximum value of the reproduction RF signal SRF1 obtained in a state where wobbling is applied to the magnetic head 9 is detected.

The inclination controller 87 detects the inclination of the track pattern formed on the magnetic tape with respect to the scanning path of the magnetic head 9 based on the RF peak signal SRF2 and supplies an offset voltage V14 that corrects the inclination to the inverted input of the sensor amplifier AMP11.

Accordingly, by supplying the differential voltage V15 between the detection output V12 of the distance sensor 11A and the offset voltage V14 to the control amplifier AMP13, an inclination of the azimuth direction in accordance with the offset voltage V14 is given to the piezoelectric actuators 10A and 10B and the scanning path of the recording head 9 can be controlled.

Figure 22A:
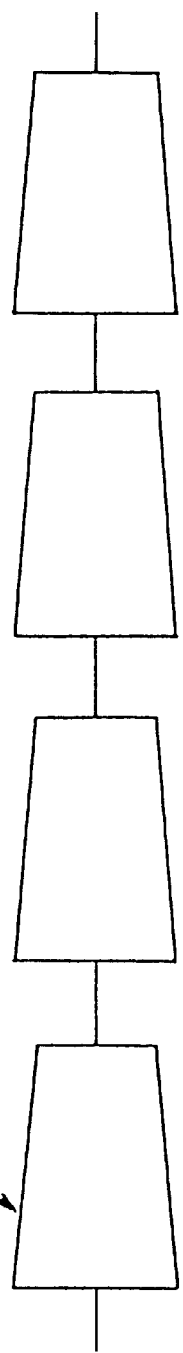
FIGS. 22A and 22B are views explaining the tracking control operation.
Figure 22B:
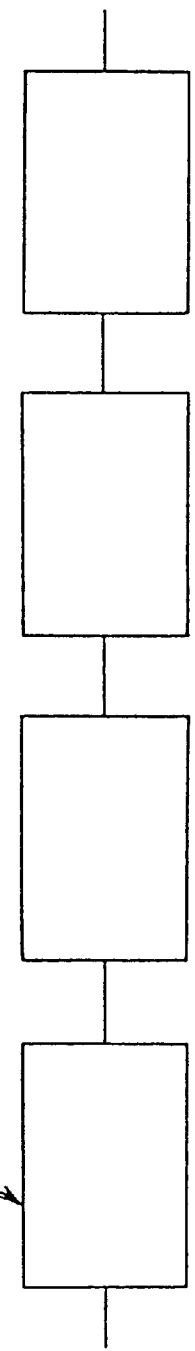

Namely, in a case where the scanning path of the magnetic head 9 is inclined with respect to the recording tracks of the magnetic tape, the reproduction RF signal SRF1 reproduced via the magnetic head 9 becomes a signal waveform with an envelope inclined as shown in FIG. 22A. In this case, the inclination controller 87 revises the scanning path of the magnetic head 9 in accordance with the recording tracks so as to coincide with the inclination of the recording tracks. Due to this, the scanning path of the magnetic head 9 coincides with the recording tracks on the magnetic tape and a good reproduction RF signal SRF1' as shown in FIG. 22B can be obtained.

In this digital VTR, by controlling the scanning path of the magnetic head 9 as mentioned above, even in a case where the direction of travel of the magnetic tape is changed to the FWD direction or the REV direction, the scanning path of the magnetic head 9 can be brought into coincidence with the recording tracks and correct reproduction from the recording tracks in the FWD direction or the REV direction can be carried out.

Further, by performing the control as mentioned above, even in a case where the angle of inclination of the recording track differs for every magnetic tape due to for example the stretching of the tape, by controlling the scanning path of the magnetic head in accordance with the recording tracks on the magnetic tape, correct reproduction from the recording tracks can be carried out.

On the other hand, the sense amplifier AMP12 receives the detection output V11 of the distance sensor 11B as the non-inverted input and receives the adjustment voltage V17 obtained by dividing the power supply voltage Vcc by the variable resistance R12 as the non-inverted input. The output of the sense amplifier AMP12 is supplied to the non-inverted input of the control amplifier AMP14.

The control amplifier AMP14 receives the detection output V13 of the distance sensor 11A as the inverted input. The output of this control amplifier AMP14 is supplied to the non-inverted input of the voltage driver AMP17. The inverted input of the voltage driver AMP17 receives the ground voltage.

Due to this, the control amplifier AMP14 supplies a difference between the detection output V13 of the distance sensor 11A and the detection output V14 of the distance sensor 11B as the error voltage V19 to the voltage driver AMP17. The voltage driver AMP 17 supplies a driving voltage V23 which makes the difference between the detection outputs V11 and V13 of the distance sensors 11A and 11B zero to the piezoelectric actuator 62. The piezoelectric actuator 62 is made to expand or contract in accordance with the driving voltage V23.

As a result, by using the height of the distance sensor 11A nearest to the moveable support point $O_1$ with respect to the zenith direction as the reference, feedback can be supplied so that the detection output of the distance sensor 11B coincides with the detection output of the distance sensor 11A and zenith adjustment (adjustment of degree of vertical displacement) of the rotating drum 8 can be carried out.

Further, when the rotating drum 8 is inclined at an angle in the zenith direction, the system controller 12 changes the ratio of division of the power supply voltage Vcc by the variable resistance R12. Due to this, the adjustment voltage V17 to be supplied to the sensor amplifier AMP12 is changed and the driving voltage V23 supplied to the piezoelectric actuator 62 can be adjusted.

Due to this, in this digital VTR, when the stationary upper drum 7 is replaced, even if there is an attachment error, the degree of vertical displacement of the rotating drum 8 can be adjusted by adjusting the adjustment voltage V17 to be supplied to the sensor amplifier AMP12 as mentioned above and therefore the recording and reproduction can be carried out after correcting the attachment error.

As explained above, in this digital VTR, when the system controller 12 controls the travel system 4 to make the magnetic tape travel in the FWD direction or the REV direction, the inclination controller 87 controls the angle of inclination of the stationary upper drum 7 in accordance with the reproduced RF signal reproduced by the magnetic head 9 as mentioned above. Due to this, the magnetic head 9 stably scans the recording tracks and the video data recorded on the recording tracks is reliably reproduced.

Note that, in the above embodiment, a magnetic head 9 having one head gap was used, but it is also possible to use a magnetic head 9 having a plurality of N number of head gaps in place of this. In this case, recording tracks are formed on the magnetic tape at every other N number of tracks (at each other mN number of tracks where a plurality of m number of magnetic heads are used) in one directional recording and the system controller 12 controls the rotation of the magnetic head and the travel of the tape so that the recording tracks are formed in the empty track recording portions in the recording of the other direction.

Further, in the above embodiments, a description was made of a case where the rotary shaft 54 rotatably attached to the stationary lower drum 6 side was driven by the drive motor 59, and the rotary shaft 44 connected to the rotary shaft 54 by the flexible joint 47 was rotated, but it is also possible if the rotary shaft 54 and the rotary shaft 44 are respectively driven to rotate in synchronization by separate drive motors.

Further, in the above embodiments, an explanation was made of the case where the present invention was applied to a digital VTR, but the present invention is not limited to the above embodiments. The present invention can be applied to any recording apparatus for performing the recording of an analog video signal, digital audio signal, audio data, or data from a data processing apparatus so long as the recording is carried out by using a rotary head drum. Of course, various modifications are possible other than this within a range not out of the technical gist of the present invention.

What is claimed is:

1. A signal recording apparatus wherein a tape-like recording medium is made to travel in a first direction of travel and a second direction of travel reverse to said first direction of travel, wherein an input signal is recorded on the tape-like recording medium by heads coupled to first and second rotary drums, said apparatus comprising:

a signal processor, including a synchronization detector for detecting synchronization information indicative of the timing of the input signal, for processing the input signal to be recorded on the tape-like recording medium;

a rotary processor, having first and second recording heads coupled respectively to said first and second rotary drums for forming N number of respective first and second recording tracks per scan on the tape-like recording medium as said first and second rotary drums rotate, for causing said first and second recording heads coupled to said first and second rotary drums to record the input signal processed by the signal processor on the tape-like recording medium as said first and second recording tracks;

a recording controller for controlling a travel speed of the tape-like recording medium and a rotational speed of the first and second rotary drums based on the synchronization information so that the first and second recording tracks are formed on the tape-like recording medium in units of N number of first and second tracks;

an angle of inclination controller for controlling the inclination of the second rotary drum with respect to said tape-like recording medium and said first rotary drum thereby setting the angle of inclination of the second recording tracks formed by the second rotary drum with respect to the second direction of travel of the tape-like recording medium; and a controller for controlling the recording of the input signal processed by the signal processor to the tape-like recording medium by causing the tape-like recording medium to travel in the first direction of travel and the second direction of travel, wherein, said controller controls the recording controller and the angle of inclination controller so that the first recording tracks are formed on said tape-like recording medium at a predetermined angle of inclination with spaces between said first recording tracks when recording in the first direction of travel, and wherein, said controller controls the recording controller so that the second recording tracks are formed during said second direction of travel in said spaces between the first recording tracks formed during recording in the first direction of travel and, at the same time, controls the angle of inclination controller so that the second recording tracks formed during recording in the second direction of travel are parallel to the first recording tracks formed during recording in the first direction of travel.

2. A signal recording apparatus as set forth in claim 1, wherein said signal recording apparatus further comprises:

a control signal generator for generating a control signal based on said synchronization information; and a control signal recorder/reproducer for recording and reproducing said control signal on said tape-like recording medium, wherein, said controller, when said control signal recorder/reproducer records said control signal, causes said tape-like recording medium to travel in said first direction of travel and causes said input signal to be recorded on said tape-like recording medium based on the control signal obtained by reproduction by said control signal recorder/reproducer when recording in said second direction of travel.

3. A signal recording apparatus as set forth in claim 2, wherein said control signal recorder/reproducer records/reproduces said control signal in a longitudinal direction of said tape-like recording medium.

4. A signal recording apparatus as set forth in claim 1, further comprising:

a first rotary holding member and a second rotary holding member for respectively holding said first and second rotary drums;

a first rotary shaft rotatably situated in said first rotary holding member;

a second rotary shaft rotatably situated in said second rotary holding member separately with respect to said first rotary shaft;

a synchronizer for synchronizing the rotation between said first rotary shaft and said second rotary shaft; and wherein said second rotary drum is affixed to said second rotary shaft, wherein, said angle of inclination controller sets said angle of inclination to said predetermined angle of inclination by controlling the inclination of said second rotary holding member.

5. A signal recording apparatus as set forth in claim 4, wherein said controller controls said angle of inclination controller so that a center of the control range of said angle of inclination is set to the angle of inclination during suspension of travel of said tape-like recording medium.

6. A signal reproducing apparatus wherein a signal is recorded on a tape-like recording medium along recording tracks having a predetermined angle of inclination formed in units of N number of first recording tracks in a first direction of travel with spaces between said first recording tracks formed in said first direction of travel, wherein said signal is recorded along M number of second recording tracks of the predetermined angle of inclination in said spaces between the first recording tracks formed in the first direction of travel, wherein second recording tracks are formed in a second direction of travel reverse to the first direction of travel, wherein a control signal indicative of the timing of the recording of said signal in the first direction of travel and the second direction of travel is recorded on said tape-like recording medium, said apparatus comprising:

first and second rotary drums, having respective first and second reproduction heads coupled thereto for reproducing the signal from the respective first and second recording tracks of the tape-like recording medium, for obtaining a reproduced signal from the first and second recording tracks formed on the tape-like recording medium;

a control signal reproducer for reproducing the control signal recorded on the tape-like recording medium;

a signal processor for processing the reproduced signal to thereby produce an output signal;

a reproduction controller for controlling a travel speed of the tape-like recording medium and a rotational speed of the first and second rotary drums based on the control signal so that the signal recorded on the first and second recording tracks on the tape-like recording medium are reproduced respectively by the first and second reproduction heads;

an angle of inclination controller for controlling the inclination of the second rotary drum relative to the first rotary drum so as to set the angle of scanning the second reproduction head with respect to the second direction of travel of the tape-like recording medium; and a controller for controlling the reproduction of the signal recorded on the tape-like recording medium based on the reproduced control signal by causing the tape-like recording medium to travel in the first direction of travel and the second direction of travel, wherein, said controller controls the reproduction controller and the angle of inclination controller to scan the first recording tracks at the predetermined angle of inclination when reproducing the tape-like recording medium in the first direction of travel, and wherein, said controller controls the reproduction controller and the angle of inclination controller so that the second recording tracks recorded in the second direction of travel between the recording tracks scanned in the first direction of travel are scanned in the second direction of travel.

7. A signal reproducing apparatus as set forth in claim 6, wherein said controller determines said N and M number of recording tracks to be reproduced in said first direction of travel and said second direction of travel based on the reproduced control signal.

8. A signal reproducing apparatus as set forth in claim 6, wherein said control signal is recorded in the longitudinal direction of the recording medium of said tape-like recording medium and said control signal reproducer reproduces said control signal recorded in the longitudinal direction of said tape-like recording medium.

9. A signal reproducing apparatus as set forth in claim 6, further comprising:

a supporting portion affixing a first rotary holding member and a second rotary holding member for respectively holding said first and second rotary drums;

a first rotary shaft rotatably situated in said first rotary holding member;

a second rotary shaft rotatably situated in said second rotary holding member separately with respect to said first rotary shaft;

a synchronizer for synchronizing the rotation between said first rotary shaft and said second rotary shaft; and wherein said second rotary drum is affixed on said second rotary shaft, and wherein, said angle of inclination controller sets the angle of scanning of said first and second reproduction heads with respect to the respective first and second directions of travel of said tape-like recording medium by respectively controlling the inclination of said first and second rotary holding members.

10. A signal reproducing apparatus as set forth in claim 9, wherein said controller controls said angle of inclination controller so that a center of the control range of the angle of scanning of said reproduction head is set to the angle of scanning during the suspension of travel of said tape-like recording medium.

11. A signal reproducing apparatus as set forth in claim 10, wherein:

said signal processor includes a signal level detector for detecting a signal level of said reproduced signal;

said first and second rotary drums includes a detector for detecting a signal level of said reproduced signal; and said controller includes a tracking controller for bringing the path of the scanning of said first and second reproduction heads into coincidence with said first and second recording tracks in accordance with the signal level of said reproduced signal and the amount of inclination of said first and second rotary drums.

12. A signal recording and reproducing apparatus wherein a tape-like recording medium is caused to travel in a first direction of travel and a second direction of travel reverse to the first direction of travel, wherein an input signal is recorded/reproduced to/from the tape-like recording medium, said apparatus comprising:

a recording signal processor, including a synchronizing detector for detecting synchronization information indicative of the timing of an input signal, for processing the input signal to be recorded on the tape-like recording medium;

first and second rotary drums, having first and second recording heads coupled respectively thereto for forming, during the respective first and second directions of travel, N number of respective first and second recording tracks per scan on the tape-like recording medium as said first and second rotary drums rotate, for recording the input signal processed by the signal processor on the tape-like recording medium on said first and second recording tracks;

first and second reproduction heads for reproducing the input signal recorded on the N number of respective first and second recording tracks per scan on the tape-like recording medium;

a reproduced signal processor for processing the signal reproduced by the first and second reproduction heads to produce an output signal;

a control signal generator for generating a control signal based on the synchronization information;

a control signal recorder/reproducer for recording and reproducing the control signal in the longitudinal direction of the tape-like recording medium;

a recording and reproduction controller for controlling a travel speed of the tape-like recording medium and a rotational speed of the first and second rotary drums based on the synchronization information so that the first and second recording tracks are formed on said tape-like recording medium on the tape-like recording medium in units of N number of tracks and controlling the travel speed of the tape-like recording medium and the rotational speed of the first and second rotary drums based on the reproduced control signal so that the signal reproduced by the first and second reproduction heads is reproduced from said tape-like recording medium;

an angle of inclination controller for controlling the inclination of the second rotary drums relative to said first rotary drum to set the angle of scanning of the second recording head and the second reproduction head with respect to the direction of travel of the tape-like recording medium; and a controller for controlling the recording of the input signal processed by the signal processor to the tape-like recording medium and the reproduction of the signal recorded on the tape-like recording medium by causing the tape-like recording medium to travel in the first direction of travel and the second direction of travel, wherein, said controller controls the recording and reproduction controller and the angle of inclination controller so that the first recording tracks are formed on said tape-like recording medium at a predetermined angle of inclination with spaces between said first recording tracks with respect to the first direction of travel of the tape-like recording medium, wherein, said controller controls the recording and reproduction controller so that the second recording tracks are formed during said second direction of travel in said spaces between the first recording tracks formed during recording in the first direction of travel, wherein, said controller controls the angle of inclination controller so that the second recording tracks formed during recording in the second direction of travel are parallel to the first recording tracks formed during recording in the first direction of travel, wherein, said controller controls the recording and reproduction controller and the angle of inclination controller based on the reproduced control signal to scan the first recording tracks at the predetermined angle of inclination when reproducing the tape-like recording medium in the first direction of travel, and wherein, said controller controls the recording and reproduction controller and the angle of inclination controller based on the reproduced control signal to scan during said second direction of travel the second recording tracks between the first recording tracks scanned during reproduction in the first direction of travel.

13. A signal recording and reproducing apparatus as set forth in claim 12, wherein said controller, when said control signal recorder/reproducer records said control signal, causes said tape-like recording medium to travel in said first direction of travel and causes said input signal to be recorded on said tape-like recording medium based on the control signal obtained by reproduction by said control signal recorder/reproducer when recording in said second direction of travel.

14. A signal recording and reproducing apparatus as set forth in claim 12, wherein said controller determines said N number of units of recording tracks to be reproduced in said first direction of travel and said second direction of travel based on the control signal reproduced by said control signal recorder/reproducer when reproducing the signal from said tape-like recording medium.

15. A signal recording and reproducing apparatus as set forth in claim 12, wherein said control signal recorder/ reproducer records/reproduces said control signal in the longitudinal direction of said tape-like recording medium.

16. A signal recording and reproducing apparatus as set forth in claim 12, further comprising:
- a first rotary holding member and a second rotary holding member for holding said first and second rotary drums, respectively;
- a first rotary shaft rotatably situated in said first rotary holding member;
- a second rotary shaft rotatably situated in said second rotary holding member separately with respect to said first rotary shaft;
- a synchronizer for synchronizing the rotation between said first rotary shaft and said second rotary shaft; and
- wherein said second rotary drum is affixed to said second rotary shaft,
- wherein, said angle of inclination controller sets the angle of scanning of said second recording head and said second reproduction head with respect to the direction of travel of said tape-like recording medium to a plurality of angles by controlling the inclination of said second rotary holding member.

17. A signal recording and reproducing apparatus as set forth in claim 16, wherein said controller controls said angle of inclination controller so that a center of the control range of the angle of scanning of said second recording head and said second reproduction head is set to the angle of scanning during suspension of travel of said tape-like recording medium.

18. A signal recording and reproducing apparatus as set forth in claim 17, further comprising:
- a signal level detector for detecting a signal level of the signal reproduced by said first and second reproduction heads;
- a detector for detecting the amount of inclination of said first and second rotary drums; and
- a tracking controller for bringing the path of the scanning of said second reproduction head into coincidence with said second recording tracks in accordance with the signal level of said reproduced signal and the amount of inclination of said first and second rotary drums.

* * * * *